US012217447B2

(12) United States Patent
Siu et al.

(10) Patent No.: US 12,217,447 B2
(45) Date of Patent: Feb. 4, 2025

(54) SECURITY CAMERA SYSTEM WITH MULTI-DIRECTIONAL MOUNT AND METHOD OF OPERATION

(71) Applicant: Tyco Fire & Security GmbH, Neuhausen am Rheinfall (CH)

(72) Inventors: Patrick Siu, Tyngsborough, MA (US); Christopher Cianciolo, Westford, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/818,818

(22) Filed: Nov. 21, 2017

(65) Prior Publication Data

US 2019/0104282 A1  Apr. 4, 2019

Related U.S. Application Data

(60) Provisional application No. 62/566,114, filed on Sep. 29, 2017.

(51) Int. Cl.
*G06T 7/70* (2017.01)
*G08B 13/196* (2006.01)
(Continued)

(52) U.S. Cl.
CPC .......... *G06T 7/70* (2017.01); *G08B 13/19632* (2013.01); *H04N 7/181* (2013.01);
(Continued)

(58) Field of Classification Search
CPC .. H04N 5/247; H04N 13/243; H04N 5/23238; H04W 4/029; H04W 4/02;
(Continued)

(56) References Cited

U.S. PATENT DOCUMENTS 5,818,519 A  10/1998  Wren
5,878,151 A  3/1999  Tang et al.
(Continued)

FOREIGN PATENT DOCUMENTS

DE  10 2006 004731  8/2007
EP  1 594 322  11/2005
(Continued)

OTHER PUBLICATIONS

Partial Search Report of the International Searching Authority, mailed on Oct. 10, 2018, from International Application No. PCT/US2018/039895, filed on Jun. 28, 2018. 9 pages.
(Continued)

*Primary Examiner* — Daniel Chang
(74) *Attorney, Agent, or Firm* — ArentFox Schiff LLP

(57) ABSTRACT

A security camera system includes a base unit and sensor modules for generating image data. The base unit includes several mounting sockets arranged at different elevational and azimuthal directions around the base unit, and the sensor modules attach to the mounting sockets. Each mounting socket includes a socket ID, which is used to stitch together the image data from different sensor modules. The sensor modules are powered wirelessly via induction and communicate wirelessly with the base unit via wireless transceivers and antennas. The security camera system is capable of automatic detection of the location of the sensor modules, as the socket IDs for the mounting sockets to which the sensor modules are attached are identified by various means including wireless beacons, signal strength positioning and/or triangulation, or via a temporary provisioning bubble that arranges socket ID designators in fields of view of each of the attached sensor modules.

20 Claims, 14 Drawing Sheets

(51) Int. Cl.
*H04N 7/18* (2006.01)
*H04N 23/51* (2023.01)
*H04N 23/54* (2023.01)
*H04N 23/55* (2023.01)
*H04N 23/57* (2023.01)
*H04N 17/00* (2006.01)
*H04W 84/18* (2009.01)

(52) U.S. Cl.
CPC ............ *H04N 23/51* (2023.01); *H04N 23/54* (2023.01); *H04N 23/55* (2023.01); *H04N 23/57* (2023.01); *H04N 17/002* (2013.01); *H04W 84/18* (2013.01)

(58) Field of Classification Search
CPC ....... H04W 4/80; H04W 64/00; H04W 8/005; H04W 12/63; H04W 84/18; H04L 67/52; H04L 67/12; H04L 63/107; H04L 63/10; H04B 17/318; H04B 17/27; H04B 1/3888
See application file for complete search history.

(56) References Cited

U.S. PATENT DOCUMENTS

| | | | | |
|---|---|---|---|---|
| 5,983,109 A * | 11/1999 | Montoya | ............... | G01S 5/0027 455/456.2 |
| 6,002,995 A * | 12/1999 | Suzuki | ................ | H04N 23/661 348/E7.086 |
| 6,476,856 B1 | 11/2002 | Zantos | | |
| 6,768,563 B1 * | 7/2004 | Murata | ................ | H04N 23/631 348/E7.086 |
| 6,799,047 B1 * | 9/2004 | Bahl | .................... | G01C 21/206 455/456.1 |
| 6,839,560 B1 * | 1/2005 | Bahl | ........................ | G01S 11/06 342/450 |
| 6,898,432 B1 * | 5/2005 | Jiang | .................... | H04W 4/029 455/552.1 |
| 6,947,059 B2 * | 9/2005 | Pierce | ................. | H04N 5/2628 348/E13.008 |
| 7,680,192 B2 | 3/2010 | Kaplinsky | | |
| 7,903,871 B2 | 3/2011 | Kaplinsky et al. | | |
| 7,922,329 B1 * | 4/2011 | Graether | ................ | A61B 3/135 351/205 |
| 8,456,513 B2 * | 6/2013 | Raynor | .................. | H04N 23/58 348/39 |
| 9,107,178 B2 * | 8/2015 | Sydir | .................. | G01S 5/02526 |
| 9,121,931 B2 * | 9/2015 | Xu | ............................ | G01S 5/14 |
| 9,227,568 B1 * | 1/2016 | Hubbell | ................ | B60R 1/28 |
| 9,389,071 B2 * | 7/2016 | Tucker | ............ | G06K 19/07749 |
| 9,430,781 B1 * | 8/2016 | Kerr | .................. | G06Q 30/0233 |
| 9,438,782 B2 | 9/2016 | Donaldson | | |
| 9,690,172 B2 | 6/2017 | Donaldson | | |
| 9,876,953 B2 * | 1/2018 | Bagnato | ............... | H04N 23/45 |
| 9,911,454 B2 * | 3/2018 | van Hoff | ............. | H04N 5/772 |
| 10,057,487 B1 | 8/2018 | Chen | | |
| 2001/0024233 A1 * | 9/2001 | Urisaka | ................ | H04N 23/661 348/E7.086 |
| 2001/0056574 A1 * | 12/2001 | Richards | ................ | H04N 7/002 348/E7.071 |
| 2002/0095486 A1 * | 7/2002 | Bahl | ........................ | H04L 67/52 709/223 |
| 2003/0118015 A1 * | 6/2003 | Gunnarsson | .......... | H04W 48/16 370/389 |
| 2004/0105005 A1 * | 6/2004 | Yamamoto | ....... | G08B 13/19656 348/E7.086 |
| 2004/0152471 A1 * | 8/2004 | MacDonald | .......... | H04W 4/026 455/456.1 |
| 2004/0166878 A1 * | 8/2004 | Erskine | .................. | H04W 4/24 455/560 |
| 2004/0203482 A1 * | 10/2004 | Bacon | .................. | H04W 88/021 455/554.1 |
| 2004/0212677 A1 * | 10/2004 | Uebbing | ................ | H04N 23/90 348/E7.086 |
| 2004/0263609 A1 * | 12/2004 | Otsuki | ................. | H04N 23/661 348/14.02 |
| 2005/0128286 A1 * | 6/2005 | Richards | ............... | H04N 21/431 348/E5.123 |
| 2005/0130677 A1 * | 6/2005 | Meunier | ............... | G01S 5/0252 455/456.6 |
| 2005/0190972 A1 | 9/2005 | Thomas et al. | | |
| 2005/0207487 A1 * | 9/2005 | Monroe | ........... | G08B 13/19641 348/E7.086 |
| 2005/0208952 A1 * | 9/2005 | Dietrich | ................ | H04W 64/00 455/456.1 |
| 2006/0014548 A1 * | 1/2006 | Bolin | ........................ | G01S 5/02 455/456.1 |
| 2006/0017842 A1 | 1/2006 | Jun | | |
| 2006/0050149 A1 * | 3/2006 | Lang | ........................ | B60R 1/28 348/E7.086 |
| 2006/0066723 A1 * | 3/2006 | Iwase | ................... | H04N 23/662 348/E7.086 |
| 2006/0276202 A1 * | 12/2006 | Moeglein | ............... | G01S 19/46 455/456.1 |
| 2007/0042706 A1 * | 2/2007 | Ledeczi | ............... | G01S 5/0289 455/3.01 |
| 2007/0109407 A1 | 5/2007 | Thompson | | |
| 2007/0185980 A1 * | 8/2007 | Abraham | ............ | H04L 41/0886 709/222 |
| 2007/0188653 A1 | 8/2007 | Pollock et al. | | |
| 2007/0213071 A1 * | 9/2007 | Hwang | ................. | H04W 4/029 455/456.1 |
| 2007/0241965 A1 * | 10/2007 | Kolavennu | ........... | G01S 13/876 342/465 |
| 2008/0004888 A1 * | 1/2008 | Davis | ...................... | G06Q 30/02 705/26.1 |
| 2008/0039114 A1 * | 2/2008 | Phatak | .................. | G01S 5/0252 455/456.1 |
| 2008/0112699 A1 * | 5/2008 | Huseth | ....................... | G01S 5/02 396/89 |
| 2008/0180537 A1 | 7/2008 | Weinberg et al. | | |
| 2008/0212840 A1 * | 9/2008 | Shalom | ................... | G01B 11/24 382/108 |
| 2009/0049702 A1 * | 2/2009 | MacDonald | .......... | G01B 21/22 33/343 |
| 2009/0303329 A1 * | 12/2009 | Morisaki | ................ | H04N 7/183 382/106 |
| 2010/0024045 A1 * | 1/2010 | Sastry | ................. | G06F 21/6245 726/28 |
| 2010/0079599 A1 * | 4/2010 | Kanma | ................. | H04N 1/32117 348/207.1 |
| 2010/0225738 A1 * | 9/2010 | Webster | .................... | B60R 11/04 348/36 |
| 2010/0250369 A1 * | 9/2010 | Peterson | ........... | G06Q 30/0261 707/E17.03 |
| 2010/0302363 A1 * | 12/2010 | Mackenzie | ............ | G01C 15/00 348/135 |
| 2011/0096166 A1 * | 4/2011 | Englander | ............... | H04N 7/183 348/148 |
| 2011/0134240 A1 * | 6/2011 | Anderson | ................ | H04W 4/38 348/143 |
| 2011/0168783 A1 | 7/2011 | Yoder | | |
| 2011/0231092 A1 * | 9/2011 | Kuo | .......................... | G01S 5/16 715/764 |
| 2012/0169842 A1 * | 7/2012 | Chuang | .................. | H04N 7/181 348/E7.001 |
| 2012/0200665 A1 * | 8/2012 | Furumura | ................ | G06T 3/4038 348/36 |
| 2012/0229672 A1 * | 9/2012 | Cok | ....................... | H04N 5/765 348/231.2 |
| 2012/0242788 A1 * | 9/2012 | Chuang | .................. | H04N 23/62 348/E7.001 |
| 2012/0300019 A1 * | 11/2012 | Yang | ...................... | G03B 17/18 348/E7.001 |
| 2013/0170378 A1 * | 7/2013 | Ray | ...................... | G06Q 10/06 370/252 |
| 2013/0229546 A1 * | 9/2013 | Furumura | ............... | H04N 23/698 348/229.1 |
| 2013/0254050 A1 * | 9/2013 | Zhu | ...................... | G06Q 20/201 705/20 |

(56) References Cited

U.S. PATENT DOCUMENTS

| | | | |
|---|---|---|---|
| 2014/0135042 A1* | 5/2014 | Buchheim | H04W 4/023 455/456.6 |
| 2014/0146132 A1* | 5/2014 | Bagnato | H04N 23/45 348/36 |
| 2014/0152802 A1* | 6/2014 | Olsson | H04N 23/45 348/84 |
| 2014/0153916 A1* | 6/2014 | Kintner | H04N 13/243 396/419 |
| 2014/0155084 A1* | 6/2014 | Pon | G01S 5/0242 455/456.1 |
| 2014/0171108 A1* | 6/2014 | Waters | B81C 1/00984 455/456.1 |
| 2014/0173439 A1* | 6/2014 | Gutierrez | H04L 43/10 715/738 |
| 2014/0264047 A1* | 9/2014 | Valentino | G01T 7/00 250/370.01 |
| 2014/0327733 A1* | 11/2014 | Wagreich | H04N 7/181 348/37 |
| 2014/0327770 A1* | 11/2014 | Wagreich | H04N 23/63 348/148 |
| 2014/0340427 A1* | 11/2014 | Baker | G06T 5/50 345/641 |
| 2014/0354828 A1 | 12/2014 | Rubinstein et al. | |
| 2015/0011175 A1* | 1/2015 | Mondal | H04W 64/003 455/456.1 |
| 2015/0029220 A1* | 1/2015 | Hittel | H04W 4/029 345/633 |
| 2015/0103171 A1* | 4/2015 | Cho | B60R 16/00 348/148 |
| 2015/0126234 A1* | 5/2015 | Rodriguez | H04M 1/72412 455/457 |
| 2015/0139007 A1* | 5/2015 | Liu | H04W 64/00 370/252 |
| 2015/0141043 A1* | 5/2015 | Abramson | G01C 21/34 455/456.1 |
| 2015/0163634 A1* | 6/2015 | Meredith | H04W 4/80 455/456.6 |
| 2015/0172289 A1* | 6/2015 | Kwon | H04W 12/122 726/3 |
| 2015/0172518 A1* | 6/2015 | Lucas | B60R 1/30 348/148 |
| 2015/0177114 A1* | 6/2015 | Kapoor | G01N 15/06 702/128 |
| 2015/0247912 A1* | 9/2015 | Tang | G01S 3/7864 348/169 |
| 2015/0271646 A1* | 9/2015 | Chang | H04W 4/029 455/457 |
| 2015/0325103 A1* | 11/2015 | Ngyuen | B62B 3/1404 340/539.1 |
| 2015/0341210 A1* | 11/2015 | Ranbro | H04L 41/0809 709/222 |
| 2015/0348580 A1* | 12/2015 | van Hoff | H04N 13/271 348/48 |
| 2015/0370915 A1* | 12/2015 | Kim | H04L 61/4511 715/234 |
| 2015/0373482 A1* | 12/2015 | Barnard | H04W 4/024 370/338 |
| 2016/0037085 A1 | 2/2016 | Mills et al. | |
| 2016/0056635 A1* | 2/2016 | Bell | H02J 7/00034 713/300 |
| 2016/0099602 A1* | 4/2016 | Leabman | H02J 50/80 307/104 |
| 2016/0099614 A1* | 4/2016 | Leabman | H02J 50/80 307/104 |
| 2016/0099757 A1* | 4/2016 | Leabman | H02J 50/001 307/104 |
| 2016/0112830 A1* | 4/2016 | Soon | H04W 4/02 455/456.1 |
| 2016/0134838 A1* | 5/2016 | Tangeland | H04N 7/152 348/14.09 |
| 2016/0173737 A1* | 6/2016 | Cho | B60R 11/04 348/148 |
| 2016/0182826 A1 | 6/2016 | Blum et al. | |
| 2016/0183046 A1* | 6/2016 | Kwon | H04W 4/029 455/456.1 |
| 2016/0191121 A1* | 6/2016 | Bell | H04B 5/79 307/104 |
| 2016/0216130 A1* | 7/2016 | Abramson | G01C 21/3423 |
| 2016/0284186 A1* | 9/2016 | Pavlich | H04W 4/023 |
| 2016/0286359 A1* | 9/2016 | Maytal | H04W 64/00 |
| 2016/0337888 A1* | 11/2016 | Zhang | G06F 16/282 |
| 2016/0357092 A1 | 12/2016 | Donaldson | |
| 2016/0366336 A1* | 12/2016 | Kuehnle | H04N 23/698 |
| 2017/0052247 A1* | 2/2017 | Kong | G01S 5/0289 |
| 2017/0055131 A1* | 2/2017 | Kong | H04W 4/027 |
| 2017/0108574 A1* | 4/2017 | Cox | G01S 5/02 |
| 2017/0278365 A1 | 9/2017 | Madar et al. | |
| 2018/0018023 A1 | 1/2018 | Nakamura et al. | |
| 2018/0109729 A1* | 4/2018 | Jang | H04N 13/366 |
| 2018/0109732 A1* | 4/2018 | Jang | G06F 3/0485 |
| 2018/0268868 A1* | 9/2018 | Salokannel | H04N 23/698 |
| 2018/0350100 A1 | 12/2018 | Hanson et al. | |

FOREIGN PATENT DOCUMENTS

| | | | | |
|---|---|---|---|---|
| EP | | 2 110 795 | 10/2009 | |
| EP | | 2 791 868 | 6/2017 | |
| WO | WO 2004042667 | | 5/2004 | |
| WO | WO-2005048586 A1 * | | 5/2005 | H04N 5/2251 |

OTHER PUBLICATIONS

Axis Q3709-PVE Network Camera: data sheet, 2015: Axis Communications AG. Two pages.

DAHUA Technology: Multi-Sensor Panoramic Camera DH-IPC-PFW8601N-H-A180: data sheet, earlier than Jun. 8, 2017: www.dahuasecurity.com. Three pages.

Hikvision DS-2CD6986F-(H) Pano-vu Series Panoramic Dome Camera: specification, 2015: Hikvision Digital Technology Co., Ltd. Four pages.

Hikvision DS-2DP1636-D Pano-vu Series 360 degree Panoramic Camera: specification, 2015: Hikvision Digital Technology Co., Ltd. Four pages.

Optera IMM Series with Sure Vision 2.0 180 degree, 270 degree, 360 degree PANORAMIC, 12 MPX IP Cameras: specification, earlier than Jun. 8, 2017: Pelco by Schneider Electric. Six pages.

Vivotek S Series MS8391-EV Multiple Sensor Network Camera: data sheet, earlier than Jun. 8, 2017: Vivotek Inc. Three pages.

Vivotek S Series MS8392-EV Multiple-Sensor Dome Network Camera: data sheet, earlier than Jun. 8, 2017: Vivotek Inc. Three pages.

Wisenet PNM-9020V 7.3 Megapixel Multi-Sensor 180 degree Panoramic Camera: data sheet, earlier than Jun. 8, 2017: Hanwha Techwin Co., Ltd. One page.

Afshari, H., et al., "The PANOPTIC Camera: A Plenoptic Sensor with Real-Time Omnidirectional Capability," J. Sign Process Syst., 70: 305-328 (2013).

International Search Report and Written Opinion of the International Searching Authority, mailed on Dec. 19, 2018, from International Application No. PCT/US2018/052908 filed on Sep. 26, 2018. 14 pages.

International Search Report and Written Opinion of the International Searching Authority, mailed on Dec. 7, 2018, from International Application No. PCT/US2018/039895, filed on Jun. 28, 2018. 17 pages.

International Search Report and Written Opinion of the International Searching Authority, mailed on Feb. 18, 2019, from International Application No. PCT/US2018/052901, filed on Sep. 26, 2018. 18 pages.

Partial Search Report of the International Searching Authority, mailed on Dec. 18, 2018, from International Application No. PCT/US2018/052901, filed on Sep. 26, 2018. 11 pages.

International Preliminary Report on Patentability, mailed on Jan. 9, 2020, from International Application No. PCT/US2018/039895, filed on Jun. 28, 2018. 10 pages, Mar. 4, 2020.

(56) References Cited

OTHER PUBLICATIONS

International Preliminary Report on Patentability, mailed on Apr. 9, 2020, from International Application No. PCT/US2018/052901, filed on Sep. 26, 2018. 10 pages.
International Preliminary Report on Patentability, mailed on Apr. 9, 2020, from International Application No. PCT/US2018/052908 filed on Sep. 26, 2018. 8 pages.

\* cited by examiner

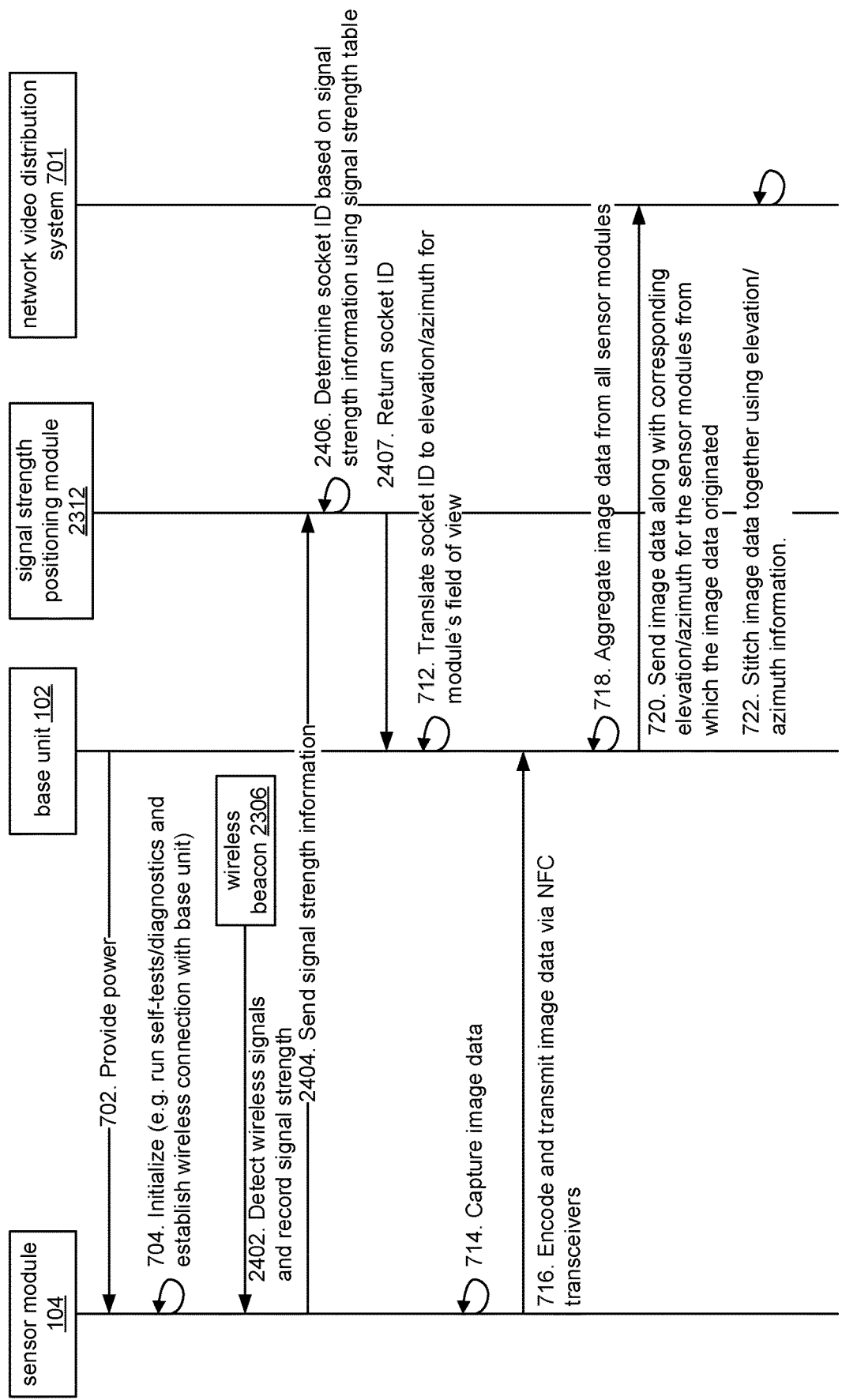

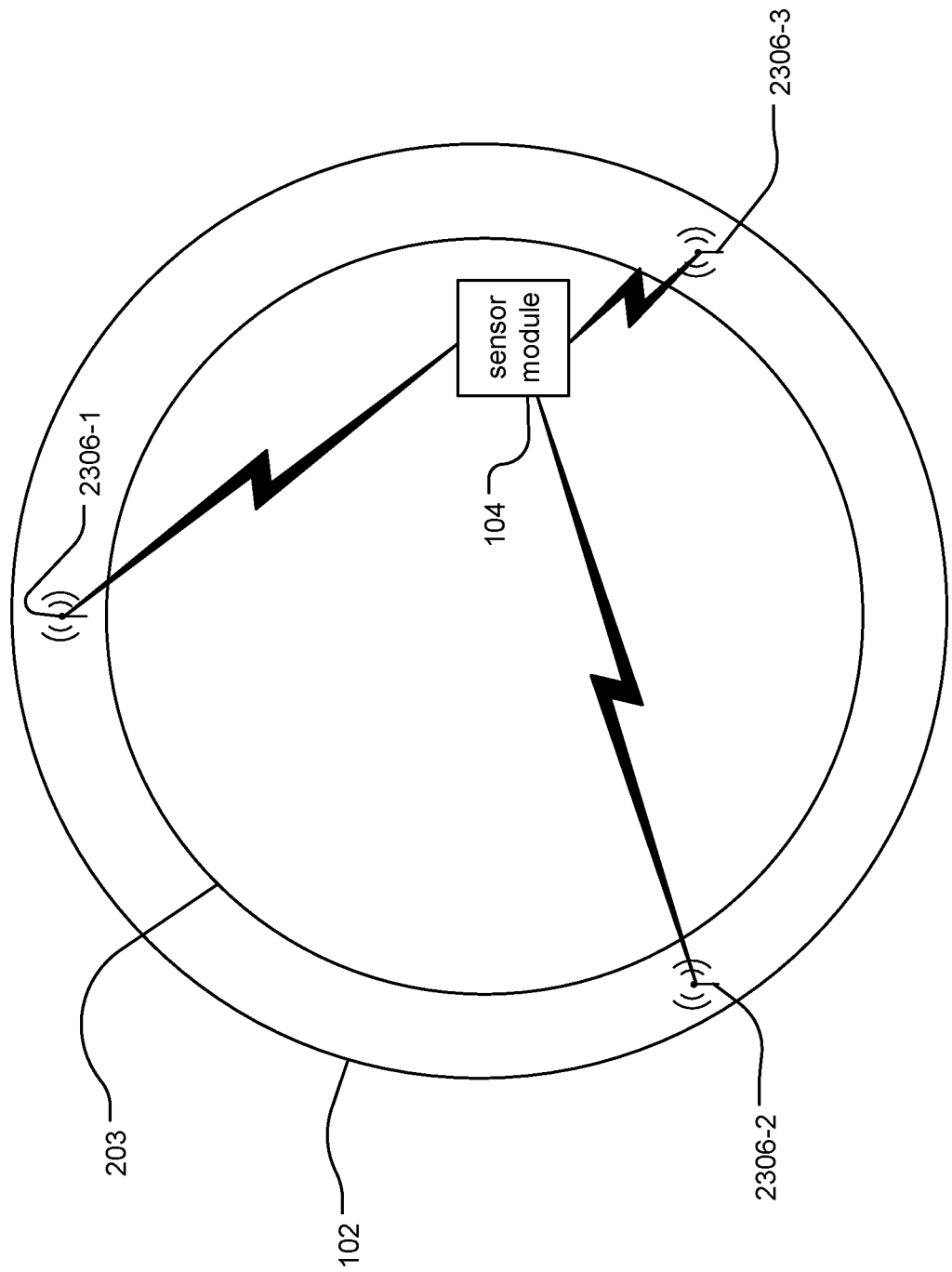

SECURITY CAMERA SYSTEM WITH MULTI-DIRECTIONAL MOUNT AND METHOD OF OPERATION

RELATED APPLICATIONS

This application claims the benefit under 35 USC 119(e) of U.S. Provisional Application No. 62/566,114, filed on Sep. 29, 2017, which application is incorporated herein by reference in its entirety.

This application is related to U.S. application number Ser. No. 15/818,816, filed on an even date herewith Nov. 21, 2017, entitled "Security Camera System with Multi-Directional Mount and Method of Operation," now U.S. Patent Publication No.: 2019/0005788 A1, and U.S. application Ser. No. 15/818,821, filed on an even date herewith Nov. 21, 2017, entitled "Security Camera System with Multi-Directional Mount and Method of Operation," now U.S. Patent Publication No.: 2019/0102903 A1.

BACKGROUND OF THE INVENTION

Video surveillance, e.g., security, systems are often deployed in and around buildings as well as in metropolitan settings. Example buildings and metropolitan settings include schools, government buildings, commercial buildings, residential buildings, multi dwelling units, roads and highways, and town and city centers.

These video security systems typically include surveillance, e.g., security, cameras that connect via a security network to a control system. Additional components include network video recorder (NVR) systems, also known as video management systems, and monitors for displaying images such as video from the security cameras.

The security cameras typically have a lenses and imager systems that are fixed, adjustable, or motorized. A fixed security camera will have the lens and imager system permanently fixed in a set position (i.e., lens and imager system cannot change position with respect to camera body). On the other hand, an adjustable security camera's lens and imager system is movable with respect to camera body (e.g., installer can move the lens and imager system to different positions) so that it can be pointed down a hall or at a door, for example. A motorized security camera, such as a pan-tilt-zoom (PTZ) security camera, utilizes motor(s) to automatically move the lens and imager system to different positions usually under operator or automatic control.

Multi-sensor security cameras, also known as multi-imager cameras, have also been deployed to capture a wide field of view. A typical multi-sensor security camera comprises two to four sensor modules. Each sensor module has a lens and imager system. The sensor modules are positioned or repositioned to cover the panoramic field of view while minimizing or eliminating blind spots. Typically, multi-sensor security cameras are designed either with sensor modules that are fixed in place or with a mechanical positioning system that can tilt the sensor modules up and down or sideways according to the specific mechanical design of the security camera system.

More recently, security cameras have been proposed that implement a single, universal design for a security camera system with a variable number of sensor modules and fields of view. An example of one such system is described in U.S. patent application Ser. No. 15/638,711 to Siu, entitled "SECURITY CAMERA SYSTEM WITH MULTI-DIRECTIONAL MOUNT AND METHOD OF OPERATION", which is incorporated herein by reference in its entirety. The security camera system includes a base unit, including a mounting dome, the surface of which includes several mounting sockets to which a variable number of sensor modules are attached mechanically or magnetically. The sensor modules can be powered wirelessly via magnetic induction. Similarly, the sensor modules might communicate with a base unit of the security camera system via low power wireless technology such as Bluetooth Low Energy (BLE), near-field communication (NFC), LiFi, and visible light communication (VLC), among other examples. The availability of several mounting sockets on the mounting dome provides practically unlimited arrangements of sensor modules, eliminating the blind spots imposed by previous mechanical designs. The variable number of sensor modules also allows for a single, universal design, regardless of the desired field of view of the security camera system, significantly reducing the complexity and cost of design, manufacturing and installation, as well as the development cycle time.

SUMMARY OF THE INVENTION

The flexibility offered by these multi-sensor security camera systems in creating customized panoramic fields of view by attaching different combinations of sensor modules to different mounting sockets of a mounting dome presents an additional challenge of determining the location and orientation of the sensor modules and associating the location and orientation of the different sensor modules with image data captured by those sensor modules in order to perform image stitching and other image analytics functions.

The present invention concerns the automatic detection of each sensor module's location on the mounting dome.

In one embodiment, a wireless beacon is located either on or at a designated distance away from the camera dome. Each sensor module includes a corresponding wireless receiver that can measure and calculate signal strength of the wireless signal received at the location where it is positioned. A mapping of the signal strength of the wireless signal to each specific location on the dome is determined, and this expected signal strength information is stored. When each sensor module is positioned on the dome, signal strength information for the wireless signals from the wireless beacon is generated by each sensor module and sent to the control electronics or software. By comparing the signal strength information to a table of expected signal strength information for each mounting socket, the control system can determine exactly where the sensor module was positioned on the dome.

On the other hand, another embodiment uses three or more wireless beacons, which are disposed at fixed locations around the dome. Each sensor module includes wireless receivers for receiving the signals from the wireless beacons. Based on the signal strength of each received signal, the sensor module triangulates its position on the dome. That position is then communicated to the control electronics or software. In an alternative embodiment, the received signal strengths can be communicated to the control electronics, which triangulates the positions of the sensor modules.

In another embodiment, a temporary provisioning bubble (similar to the protective bubble used during normal operation of the camera) is secured over the base unit any attached sensor modules, and the protective bubble. The provisioning bubble includes electrically decipherable graphics that can be seen in the images generated by each sensor module. The graphics indicate the location of the imager assembly such that the system can analyze the image from each sensor module and automatically determine where it is located on the dome. As one example the graphics could be a bar code or a QR code, or any other code that a system can interpret visually. Accordingly, all sensor modules can be positioned on the dome and the regular protective bubble housing installed, if used. Then the provisioning bubble is placed over the protective bubble, and the system analyzes image data from each sensor module and determines its location. Once all sensor modules are mapped to locations on the dome, the provisioning bubble is removed.

In general, according to one aspect, the invention features a security camera system comprising a base unit and sensor modules for generating image data. The base unit includes a plurality of mounting points, at which the sensor modules attach to the base unit. Signal strength modules of the sensor modules generate signal strength information based on wireless signals transmitted by one or more wireless transmitters and detected by wireless receivers of the sensor modules. A positioning module determines positions of the sensor modules based on the signal strength information.

In embodiments, the positioning module determines the positions of the sensor modules by comparing the signal strength information to expected signal strength information stored for each of the mounting points, or by generating location information indicating locations of the sensor modules with respect to the wireless transmitters based on the signal strength information and comparing the location information to expected location information stored for each of the mounting points. The one or more wireless transmitters are integral with and/or attached to the base unit or positioned at predetermined distances away from the security camera system.

In general, according to one aspect, the invention features a security camera system comprising a base unit and sensor modules for generating image data. The base unit includes a plurality of mounting points, at which the sensor modules attach to the base unit. A provisioning bubble arranges mounting point designators within different fields of view of the sensor modules, and a provisioning bubble mapping module determines positions of the sensor modules based on the mounting point designators depicted in the image data.

In embodiments, the provisioning bubble is temporarily secured over the base unit and the sensor modules, and the mounting point designators include optical codes and/or alphanumeric characters. The provisioning bubble mapping module determines positions of the sensor modules by identifying the mounting points to which the sensor modules are attached based on the mounting point designators. Aligning guides of the provisioning bubble and the base unit indicate the correct rotational alignment of the provisioning bubble with respect to the base unit.

In general, according to another aspect, the invention features a method for configuring a multi-sensor security camera system including a base unit with a plurality of mounting points and sensor modules for attaching to the base unit at the mounting points and generating image data. One or more wireless transmitters transmit wireless signals. The sensor modules generate signal strength information based on the wireless signals. Positions of the sensor modules are determined based on the signal strength information.

In general, according to another aspect, the invention features a method for configuring a multi-sensor security camera system including a base unit with a plurality of mounting points and sensor modules for attaching to the base unit at the mounting points and generating image data. A provisioning bubble arranges mounting point designators within different fields of view of the sensor modules, and positions of the sensor modules are determined based on the mounting point designators depicted in the image data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 7 is a sequence diagram illustrating the process by which the base unit determines the location of the sensor modules via the signal strength positioning module and reports to the network video distribution system;

FIG. 9 is a plan view of the mounting dome, base unit and one exemplary sensor module showing the sensor module receiving wireless signals transmitted by three exemplary wireless beacons;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
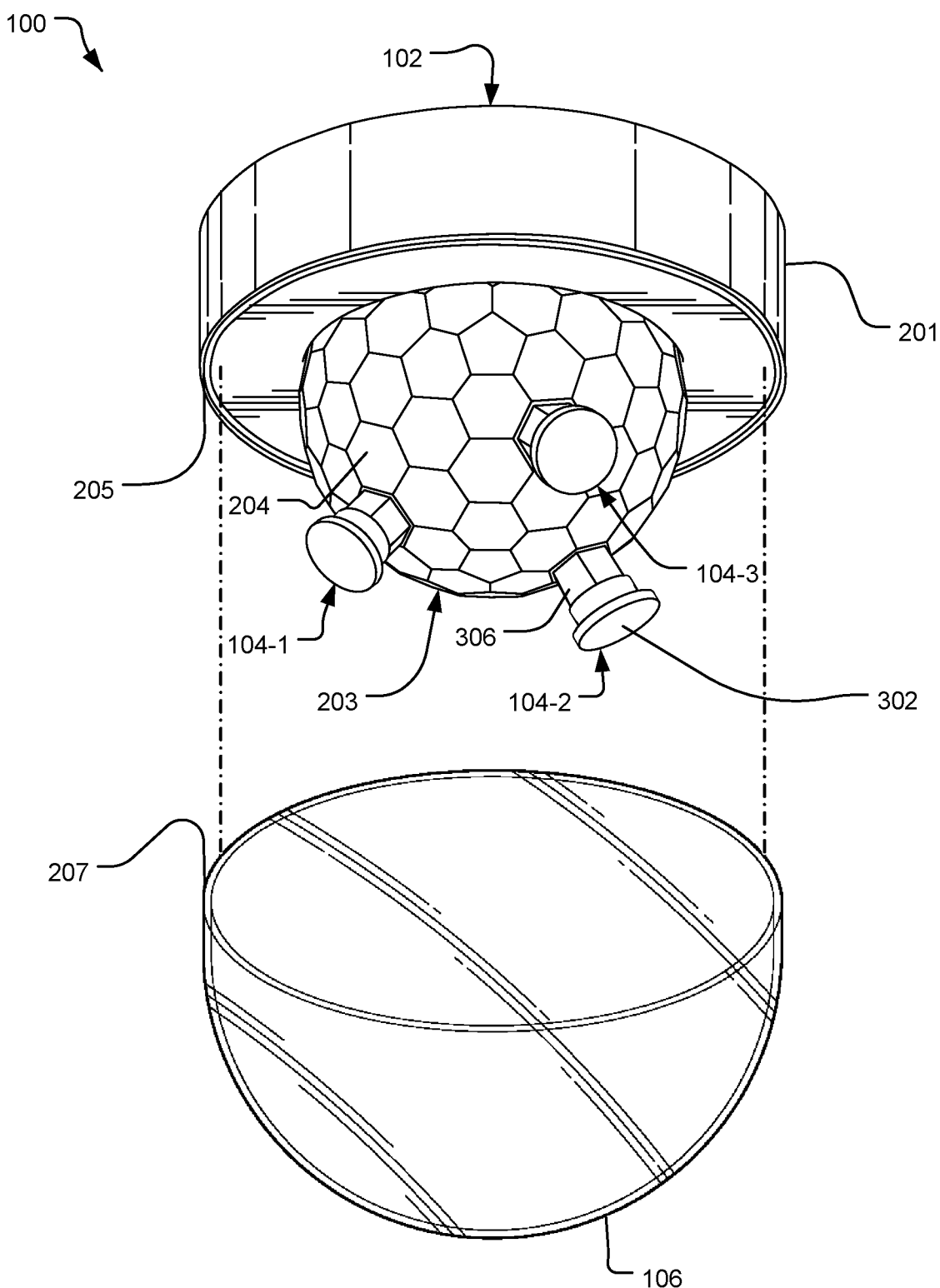
FIG. 1 is a perspective view of a security camera system to which the present invention is applicable, in which a transparent bubble is shown exploded off the security camera system.

FIG. 1 is a perspective view of a security camera system 100 to which the present invention is applicable.

The security camera system 100 includes a base unit 102, sensor modules 104 and a transparent bubble 106. The transparent bubble 106 is shown exploded off the security camera system 100.

The base unit 102 includes a camera base 201 and a mounting dome 203. The camera base 201 is a cylindrical assembly, a top circular surface of which faces and attaches to a surface of a building or other structure on which the security camera system 100 is mounted, typically a ceiling or wall or mounting bracket. The mounting dome 203 is a dome, such as a hemispherical dome, protruding from a bottom circular surface of the camera base 201 to which the sensor modules 104 attach.

The mounting dome 203 includes several mounting points, which are particular locations on the surface of the mounting dome at which sensor modules 104 are attached to the mounting dome 203 of the base unit 102. In the illustrated example, the mounting points are mounting sockets 204, which are identically-sized regions of the surface of the mounting dome 203 defined by raised ridges along the perimeters of the sockets and/or depressed regions within the interior of the sockets. The mounting sockets 204 are arrayed across the entire round surface of the mounting dome 203 such that the mounting sockets 204 face radially outward from a center of the hemispherical mounting dome 203 at regularly spaced intervals. Other examples of mounting points can include mesas and/or raised regions of the surface of the mounting dome 203, or even undifferentiated points on the surface of the mounting dome 203, among other examples.

In the illustrated example, the mounting sockets 204 are hexagonal depressions. The front portion of the mounting dome 203 (visible in the illustration) includes about thirty mounting sockets 204, and the mounting dome 203 in its entirety (including portions of the mounting dome 203 not visible in the illustration) would have about sixty mounting sockets 204 in total, as the mounting sockets 204 extend to cover the entire outer surface of the mounting dome 203.

In alternative embodiments, the mounting sockets 204 can be other shapes such as circles, octagons, pentagons, or triangles, among other examples. The size and number of the mounting sockets 204 could also vary, based on the different embodiments. In general, there are at least 4 mounting sockets, but 10, 15, or 20 or more is preferred. Regions between the mounting sockets 204 can separate the different mounting sockets 204, or the mounting sockets 204 can tile across the surface of the mounting dome 203 without any regions between the mounting sockets 204.

In general, the mounting sockets 204 represent regions of the mounting dome 203 to which the sensor modules 104 can be attached.

Each sensor module 104 includes a proximal end and a distal end. The distal end engages the exterior surface of the mounting dome 203 at a particular mounting point. At the distal end of the sensor module is a mounting plug 306. The mounting plug 306 is prismatic shaped in the illustrated embodiment, with a distal exterior surface sharing the same shape and approximate size as each of the mounting sockets 204 and engaging with the exterior surface of the mounting dome 203 within the perimeter of one of the mounting sockets 204.

In the illustrated example, the mounting plug 306 is a hexagonal prism, matching the hexagonal shape of the mounting sockets 204 depicted in the same illustration. However, in other embodiments in which the mounting sockets 204 take different shapes, the distal surface of the module mounting plug 306 would correspond to the shape of the mounting sockets 204.

At the proximal end of the sensor module 104 is a lens system 302, which is encased in a cylindrical assembly. In general, the sensor module 104 generates image data from light captured via the lens system 302, with the lens system forming an image of that light onto an image sensor, inside the module.

The sensor modules 104 are attached to the mounting dome 203 such that their optical axes extend radially from the center of the mounting dome 203 in different elevational and azimuthal directions, corresponding to the positions of the different mounting sockets 204 along the surface of the dome. In general, the number of sensor modules 104 and the selection of mounting sockets 204 to which the modules attach determines a field of view of the security camera system 100.

The transparent bubble 106 is a hollow, rigid, hemisphere of transparent material. A circular rim 207 (forming the perimeter of a circular, flat face of the transparent bubble 106) inserts into an attachment ridge 205 along the perimeter of the bottom face of the camera base 201 and is secured via an attachment mechanism such as a snap fit.

The transparent bubble 106 is secured to the camera base 201 such that it encases the mounting dome 203 and attached sensor modules 104.

Figure 2:
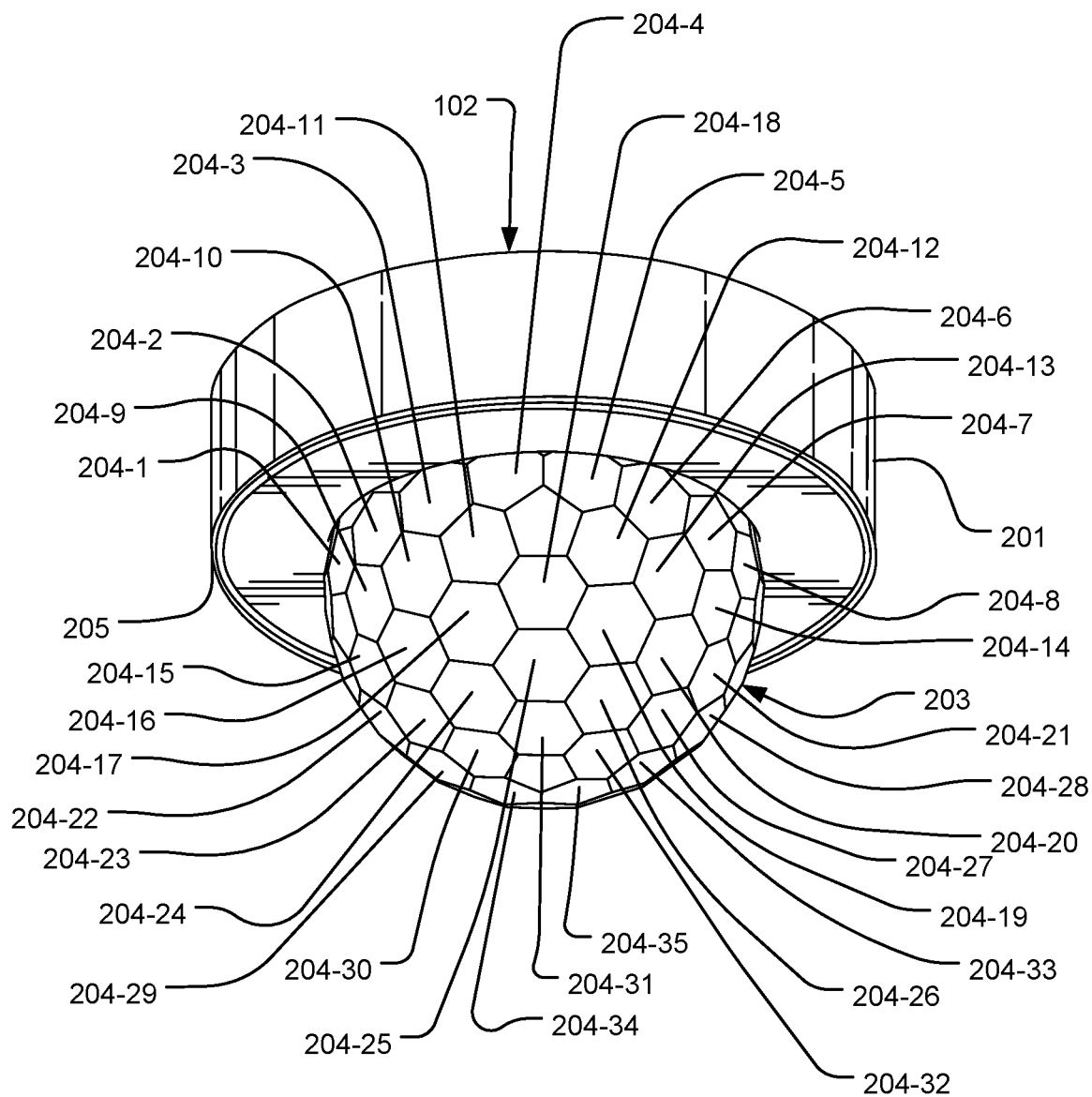
FIG. 2 is a perspective view of a base unit of the security camera system.

FIG. 2 is a perspective view of the base unit 102 of the security camera system 100 without any sensor modules 104 attached to it, depicting the camera base 201, mounting dome 203, mounting sockets 204 and attachment ridge 205. Here more of the mounting sockets have been labeled, specifically 204-1 to 204-35, to illustrate the number of potential locations at which the modular sensor modules 104 can be installed. A similar number of mounting sockets are available on the backside of the unit, but not shown in this view.

Figure 3:
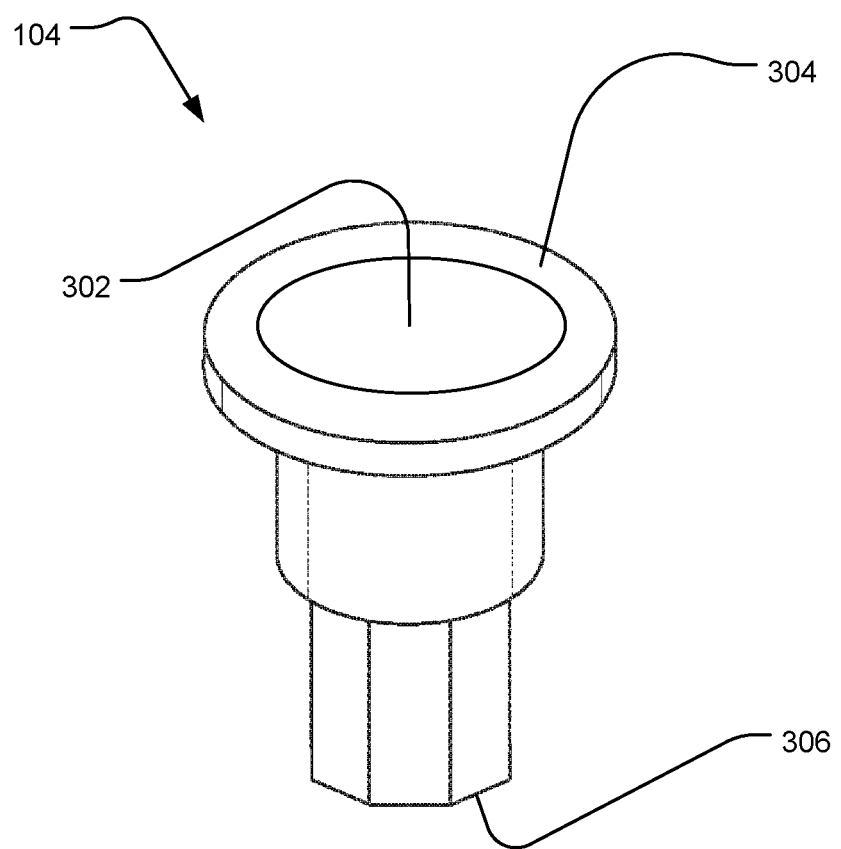
FIG. 3 is a perspective view of a sensor module of the security camera system.

FIG. 3 is a perspective view of the sensor module 104, depicting the lens system 302 and module mounting plug 306.

Also shown is a bubble contact ring 304, which is a ring of elastic material that compresses around the proximal end of the assembly containing the lens system 302 defining the module's entrance aperture. An interior surface of the transparent bubble 106 presses against the bubble contact ring 304 preventing movement and/or vibration of the sensor modules 104 and urging the sensor modules into their respective sockets.

Figure 4:
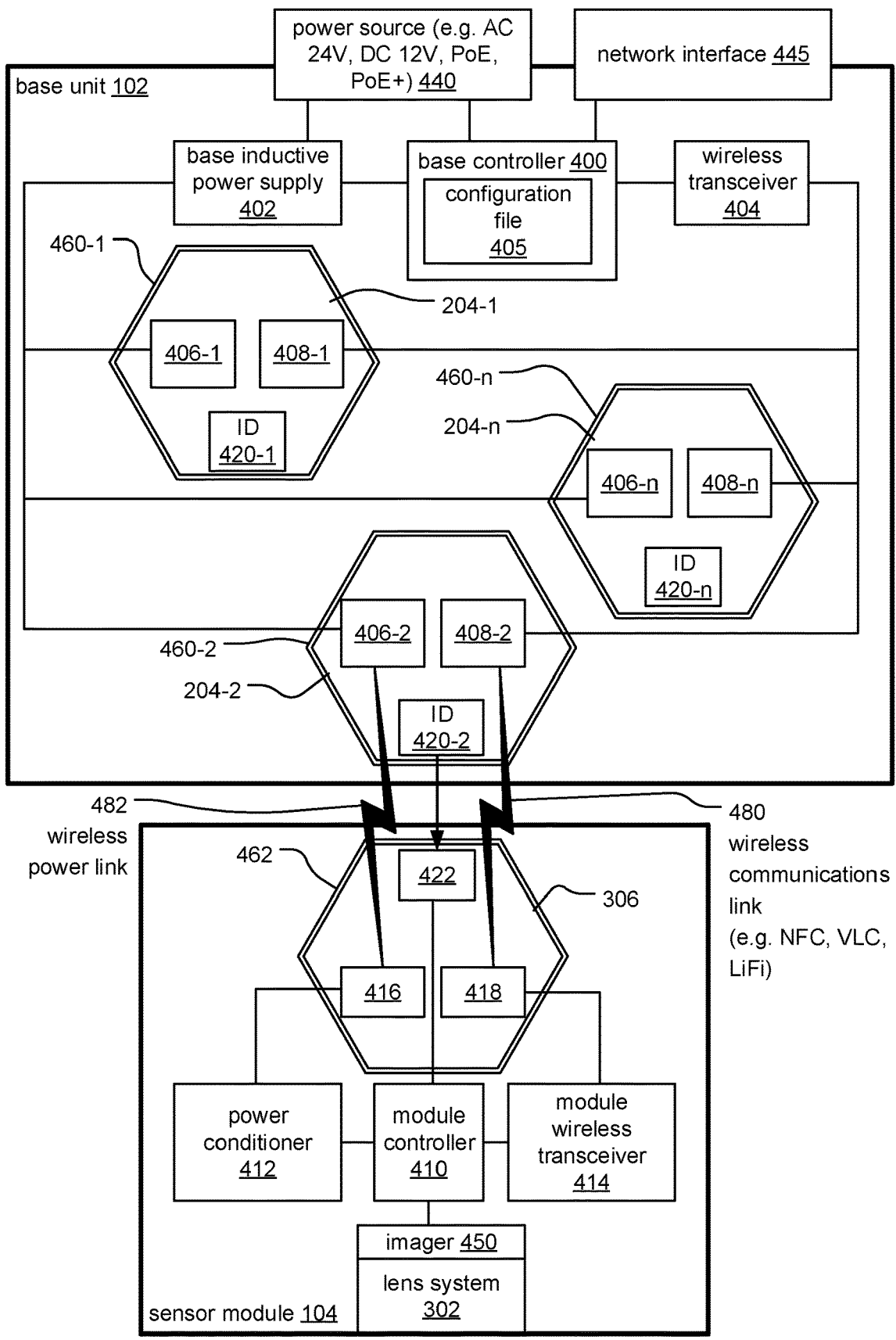
FIG. 4 is a schematic diagram of the base unit and the sensor module according to one embodiment of the present invention.

FIG. 4 is a schematic diagram of the base unit 102 and the sensor module 104 according to one embodiment of the current invention.

The base unit 102 includes a power source 440, a base inductive power supply 402, a base controller 400, a wireless transceiver 404, a network interface 445, and several mounting sockets 204. In the figure, only 3 mounting sockets are shown, but in the typical embodiment, the number of mounting sockets 204 would be at least 4, but typically 10 or more are provided. Each mounting socket includes a socket magnetic mount 460, an inductive power transmitter 406, a wireless antenna 408, and a socket identification (ID) module 420.

The sensor module 104 includes a module controller 410, a power conditioner 412, a module wireless transceiver 414, a lens system 302 and imager 450, and a module mounting plug 306, which includes a module magnetic mount 462, an inductive power receiver 416, a wireless antenna 418 and an ID reader module 422.

In general, the sensor module 104 generates image data. Incoming light is collected and focused by the lens system 302 on an imager 450, such as a CCD or CMOS imager. The image data is sent the base unit 102. The base unit 102 receives image data from one or more sensor modules 104 and associates the image data from each sensor module 104 with elevation and azimuth information associated with the mounting socket 204 to which the sensor module 104 is attached.

The power source 440 provides power to the components of the base unit 102 including the base controller 400 and the base inductive power supply 402. In different examples, the power source can be a battery, an AC 24V power supply, a DC 12V power supply, or a power supply utilizing Power over Ethernet (PoE) or PoE+ technologies.

The base controller 400 executes firmware instructions and, in general, sends instructions to and receives data from the base inductive power supply 402, sensor modules 104 via the wireless transceiver 404 and wireless antenna(s) 408, and the network interface 445. More specifically, the base controller 400 receives image data from the sensor modules 104 and sends it to a network video distribution system 701 via the network interface 445.

In the illustrated embodiment, the base unit 102 wirelessly provides power to the sensor modules 104 via the base inductive power supply 402, inductive power transmitters 406, inductive power receivers 416, and the power conditioner 412. When the sensor module 104 is attached to the mounting socket 204-2, the inductive power transmitter 406-2 at or near the surface of the mounting dome 203 in the region containing the mounting socket 204-2 come into proximity with the inductive power receiver 416 of the sensor module 104. The base inductive power supply 402 supplies an alternating current to the inductive power transmitter 406, which is, for example, a coil. An oscillating magnetic field is formed, which induces an alternating current in the inductive power receiver 416, as illustrated as a wireless power link 482. This alternating current is then conditioned by the power conditioner 412, for example, by converting it to direct current to power the sensor module 104.

The module controller 410 receives power from the power conditioner 412 and image data from the imager 450 (based on light captured by the lens system 302). The module controller 410 also sends instructions to and receives ID information (for the mounting socket 204 to which the sensor module 104 is attached) to and from the ID reader module 422. The module controller 410 sends the image data and the ID information to the base unit 102 via the wireless transceiver 414.

The base wireless transceiver 404 and the module wireless transceiver 414 wirelessly (e.g. via near-field communication, visible light communication or LiFi technologies) send and receive information to each other via a wireless communications link 480 between the base wireless antenna 408 and the module wireless antenna 418, respectively.

In general, the socket ID module 420 is a physical representation of a socket ID, which, in turn, is a unique identifier associated with each mounting socket 204. The socket ID is detected by the ID reader module 422 interacting with the socket ID module 420.

A configuration file 405 of the base unit 102 (for example, stored in nonvolatile memory of the base controller 400) includes information about the elevation and azimuth associated with the different fields of view from the mounting sockets 204. In the illustrated embodiment, in which each mounting socket 204 includes a socket ID module 420, the configuration file 405 directly associates the elevation and azimuth information for the different mounting sockets 204 with the socket IDs of the mounting sockets 204 (for example, in a table). In other examples, however, the configuration file 405 includes other identification information in addition to or instead of the socket IDs, including identification and/or address information for reader modules or sensors of the base unit 102 that are used to identify the mounting socket 204 to which the sensor module 104 is attached. Typically, this mapping of elevation and azimuth information to mounting sockets 204, using socket IDs and/or other identification information, was provided during an initial configuration of the base unit 102 during manufacturing.

The sensor modules 104 attach to the mounting sockets 204 via the socket magnetic mount 460 and the module magnetic mount 462. In one example, the magnetic mounts 460, 462 are formed of ferromagnetic material and/or magnets that are attracted to each other.

In the illustrated example, three mounting sockets 204-1, 204-2, 204-n are depicted, and the sensor module 104 is attached to mounting socket 204-2. The sensor module 104 would be attached to the mounting socket 204-2 in such a way to allow the inductive transmitter 406-2, wireless transceiver 408-2 and socket ID module 420-2 of the mounting socket 204-2 to interface with the inductive power receiver 416, wireless transceiver 418 and ID reader module 422 of the sensor module 106. In different examples, this may involve the components of the mounting socket 204 to come in direct contact with their counterparts on the sensor module 104, or to simply come in close proximity.

Figure 5:
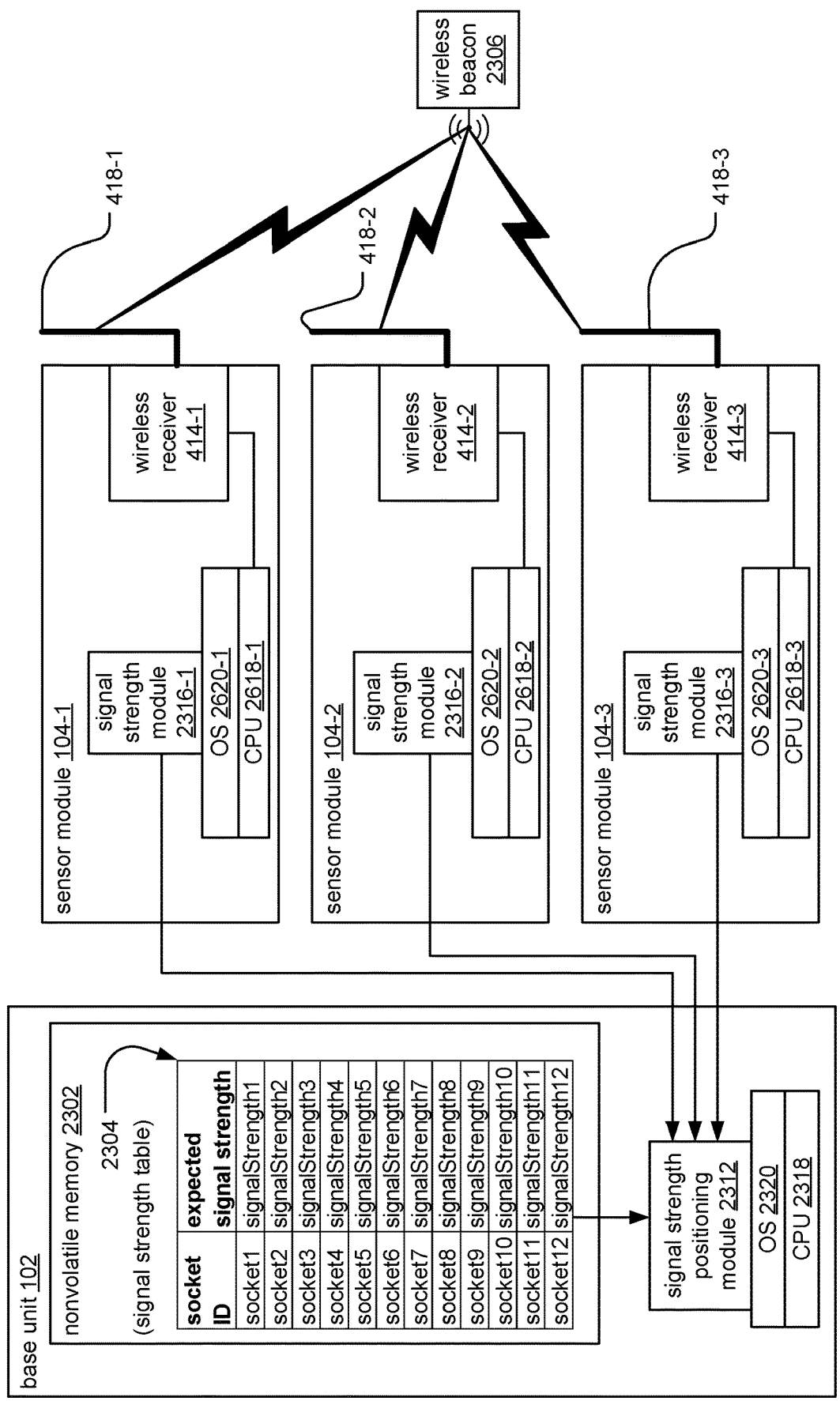
FIG. 5 is a schematic diagram of the base unit and sensor modules according to one embodiment of the present invention in which the positions of the sensor modules are determined based on wireless signals transmitted by a wireless beacon.

FIG. 5 is a schematic diagram of the base unit 102 and sensor modules 104 according to one embodiment of the present invention in which the positions of the sensor modules 104 are determined based on wireless signals transmitted by a wireless beacon 2306.

The wireless beacon 2306 transmits wireless signals. The wireless signals include, for example, data packets containing unique identification information for the wireless beacon 2306. In different embodiments, the wireless beacon 2306 is integral with and/or attached to the base unit 102 or positioned a predetermined distance away from the security camera system 100. The beacon may employ the Bluetooth protocol or Bluetooth low energy (BLE).

The sensor module 104 includes a wireless receiver 414 (which is part of the previously described module wireless transceiver 414) and a signal strength module 2316, which executes on an operating system (OS) 2620 and a central processing unit (CPU) 2618 of the sensor module 104. The wireless receiver 414 detects wireless signals transmitted by the wireless beacon 2306. The signal strength module 2316 generates signal strength information, including measurements of the signal strength of the wireless signals detected by the wireless receiver 414.

The base unit 102 includes a signal strength positioning module 2312 executing on its OS 2320 and CPU 2318 of the base unit 102. In general, the signal strength positioning module 2312 determines the positions of the sensor modules based on the signal strength information received from the individual signal strength modules of the sensor modules 104.

More specifically, the signal strength positioning module 2312 determines the socket IDs for the mounting sockets 204 to which the sensor modules 104 are attached by comparing the signal strength information originating from the sensor modules 104 to expected signal strength information stored for each of the mounting sockets 204. The expected signal strength information includes signal strength measurements of wireless signals transmitted by the wireless beacon 2306 recorded from known locations or relative positions of the different mounting sockets 204.

In the illustrated example, the expected signal strength information is stored in a signal strength table 2304 in nonvolatile memory 2302 of the base unit 102. The signal strength table 2304 includes a socket ID column and an expected signal strength information column such that socket IDs listed in the socket ID column are associated with expected signal strength information in the expected signal strength column. The signal strength positioning module 2312 compares the signal strength information from the sensor module 104 to the expected signal strength information stored in the signal strength table 2304 and, for example, returns the socket ID associated with expected signal strength that best matches the signal strength information from the respective sensor modules 104.

Figure 6:
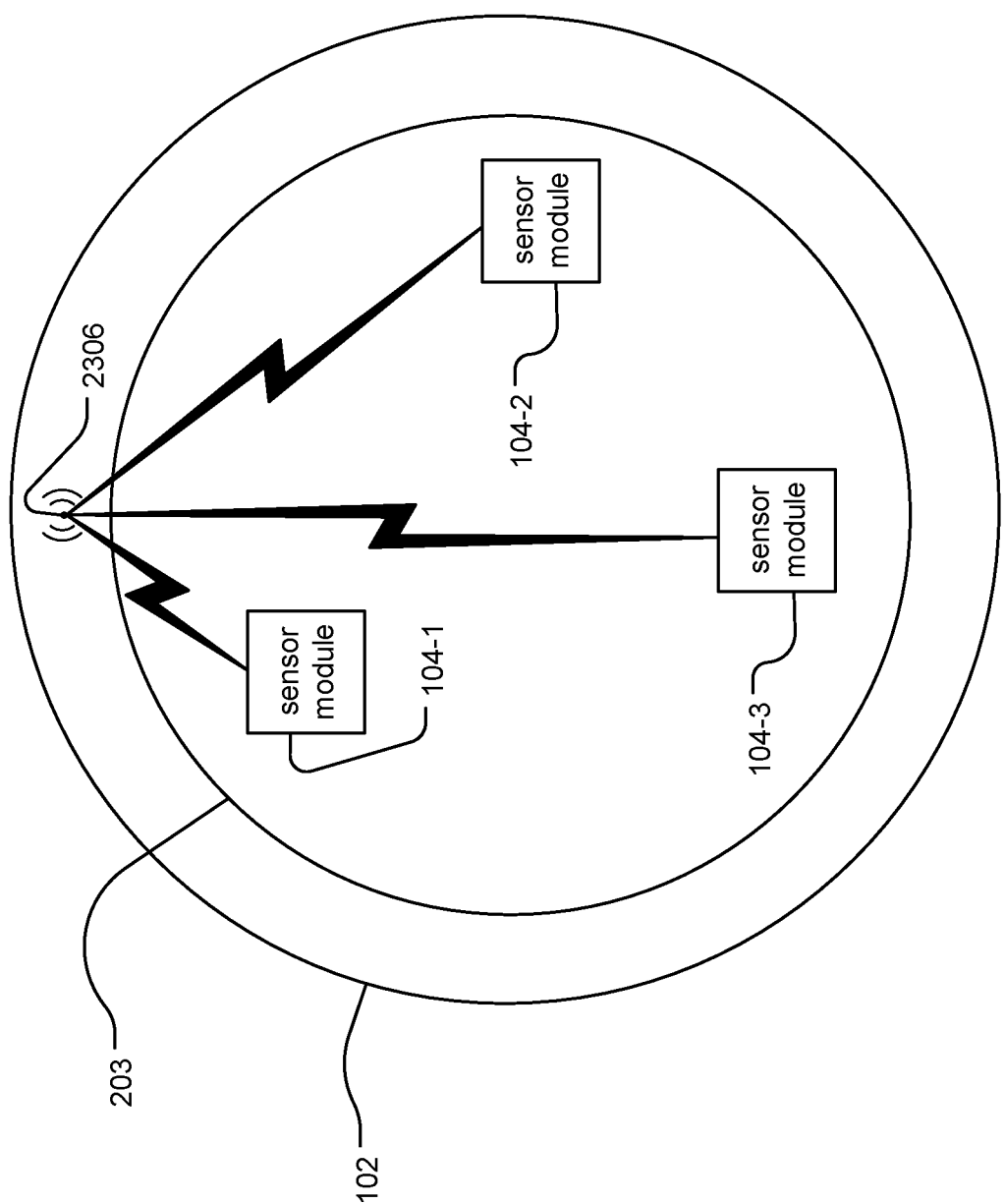
FIG. 6 is a plan view of the mounting dome, base unit and three exemplary sensor modules showing the sensor modules receiving wireless signals transmitted by the wireless beacon.

FIG. 6 is a plan view of the mounting dome 203, base unit 102 and three exemplary sensor modules 104 showing the sensor modules 104 receiving wireless signals transmitted by the wireless beacon 2306.

In the illustrated example, three sensor modules 104 are attached at to the mounting dome at different mounting points. The wireless beacon 2306 is positioned on the base unit 102 at a varying distance from each of the three sensor modules 104. For example, sensor module 104-1 is positioned the closest to the wireless beacon 2306, followed by sensor module 104-2 and then by sensor module 104-3. As a result, different signal strength information would be generated by each of the sensor modules 104.

FIG. 7 is a sequence diagram illustrating the process by which the base unit 102 determines the location of the sensor modules 104 via the signal strength positioning module 2312 and reports to the network video distribution system 701.

In step 702, the base unit 102 provides power to the sensor module 104. This can be done inductively as previously described or via a wired connection.

In step 704, the sensor module 104 initializes itself in response to receiving power from the sensor module 104. In one example, the sensor module 104 runs self-tests/diagnostic procedures and establishes wireless communications with the base unit 102 as well as sends unique identification information for the sensor module 104, such as a sensor module ID, to the base unit 102.

In step 2402, the wireless beacon 2306 transmit wireless signals, which are detected and for which signal strength information is generated by the signal strength module 2316 of the sensor module 104. In step 2404, the sensor module 104 sends the signal strength information to the signal strength positioning module 2312, which, in step 2406, determines the socket ID for mounting socket 204 to which the sensor module 104 is attached based on the signal strength information. In one example, the signal strength positioning module 2312 retrieves from the signal strength table 2304 the socket ID associated with expected signal strength information that matches the signal strength information from the sensor module 104. In step 2407, the signal strength positioning module 2312 returns the socket ID to the base unit 102.

In step 712, the base unit 102 translates the socket ID received from the sensor module 104 into elevation/azimuth information for the sensor module's 104 field of view by, for example, retrieving the elevation/azimuth information associated with the socket ID from the configuration file 405.

In step 714, the sensor module 104 captures image data, which is then encoded and transmitted to the base unit 102 in step 716.

In step 718, the base unit 102 aggregates the image data from all of the sensor modules 104 or, alternately, stitches together the image data from each of the sensor modules 104 based on the elevation/azimuth information. In step 720, depending on the step 718, either the aggregated image data comprising the separate streams for each sensor module 104, along with the corresponding elevation/azimuth information, or the stitched image data, are sent to the network video distribution system 701. In one example, the elevation/azimuth information is included as meta-data of the image data.

Finally, in step 722, the network video distribution system 701 uses the elevation/azimuth information pertaining to each of the sensor modules 104 to stitch together the image data if it was not previously stitched together by the base unit 102.

Figure 8A:
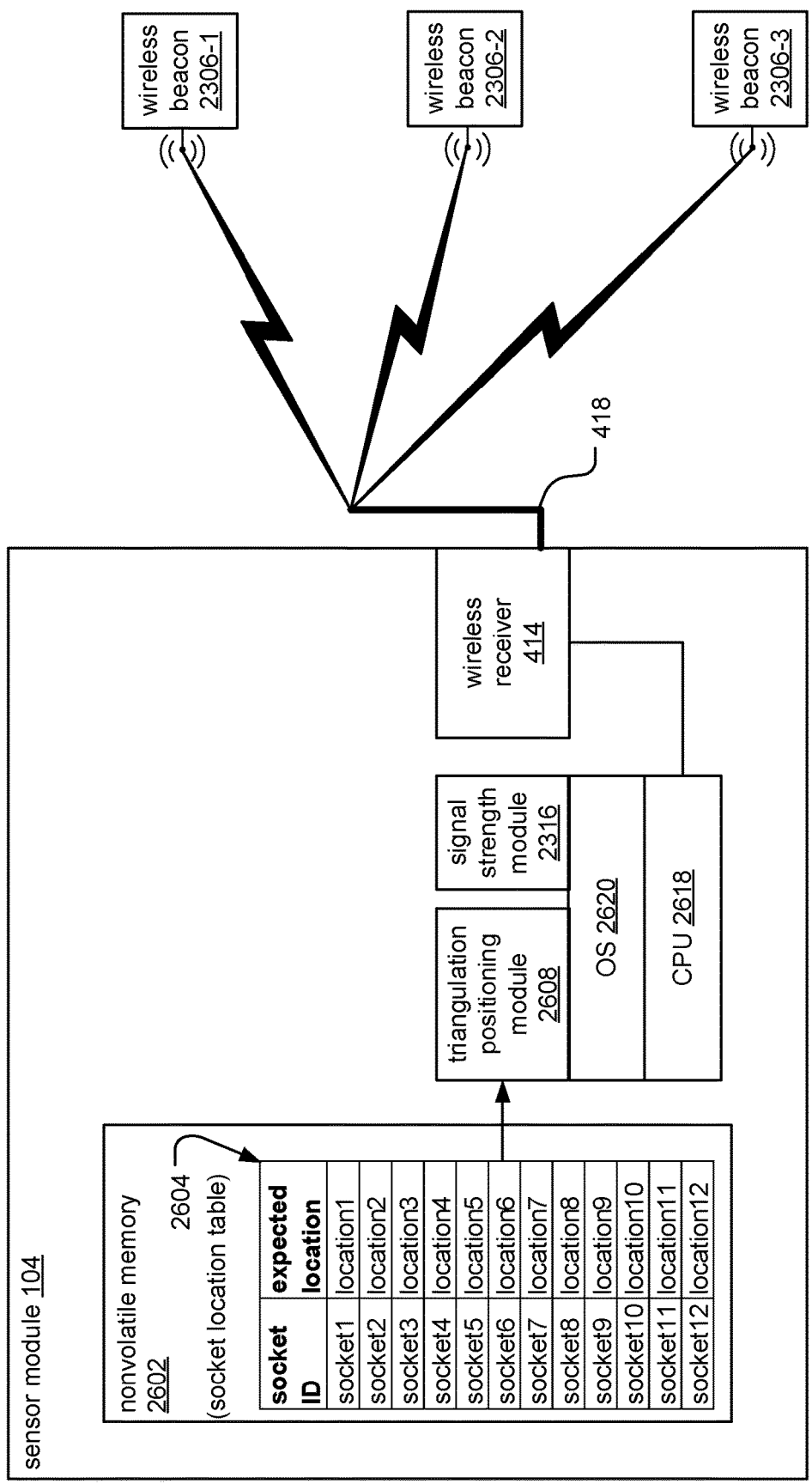
FIG. 8A is a schematic diagram of the sensor module according to another embodiment of the present invention in which the positions of the sensor modules are determined based on wireless signals transmitted by several wireless beacons.

FIG. 8A is a schematic diagram of the sensor module 104 according to another embodiment of the present invention in which positions of the sensor modules 104 are determined based on wireless signals transmitted by several wireless beacons 2306.

Now, the sensor module 104 includes a triangulation positioning module 2608, which executes on the OS 2620 and the CPU 2618. In general, the triangulation positioning module 2608 receives signal strength information from the signal strength module 2316 pertaining to wireless signals detected by the wireless receiver 414 from multiple different wireless beacons 2306 and determines positions of the sensor module 104 based on the signal strength information of the wireless signals originating from the plurality of wireless beacons 2306. In the illustrated example, the sensor module 104 receives wireless signals from three wireless beacons 2306-1, 2306-2, 2306-3.

More specifically, the triangulation positioning module 2608 determines the socket ID for the mounting socket 204 to which the sensor module 104 is attached by generating location information indicating a location of the sensor module 104 with respect to the wireless beacons 2306 and comparing the location information to expected location information stored for each of the mounting sockets 204. The expected location information includes known locations or relative positions of each of the different mounting sockets 204 with respect to the wireless beacons 2306.

In the illustrated example, the expected location information is stored in a socket location table 2604 in nonvolatile memory 2602 of the sensor module 104. The socket location table 2604 includes a socket ID column and an expected location column. The triangulation module 2608 compares the calculated location information for the sensor module 104 to the expected location information stored in the socket location table 2604 and, for example, returns the socket ID associated with expected location that matches the calculated location for the sensor module 104. The socket ID is then sent to the base unit 102.

Figure 8B:
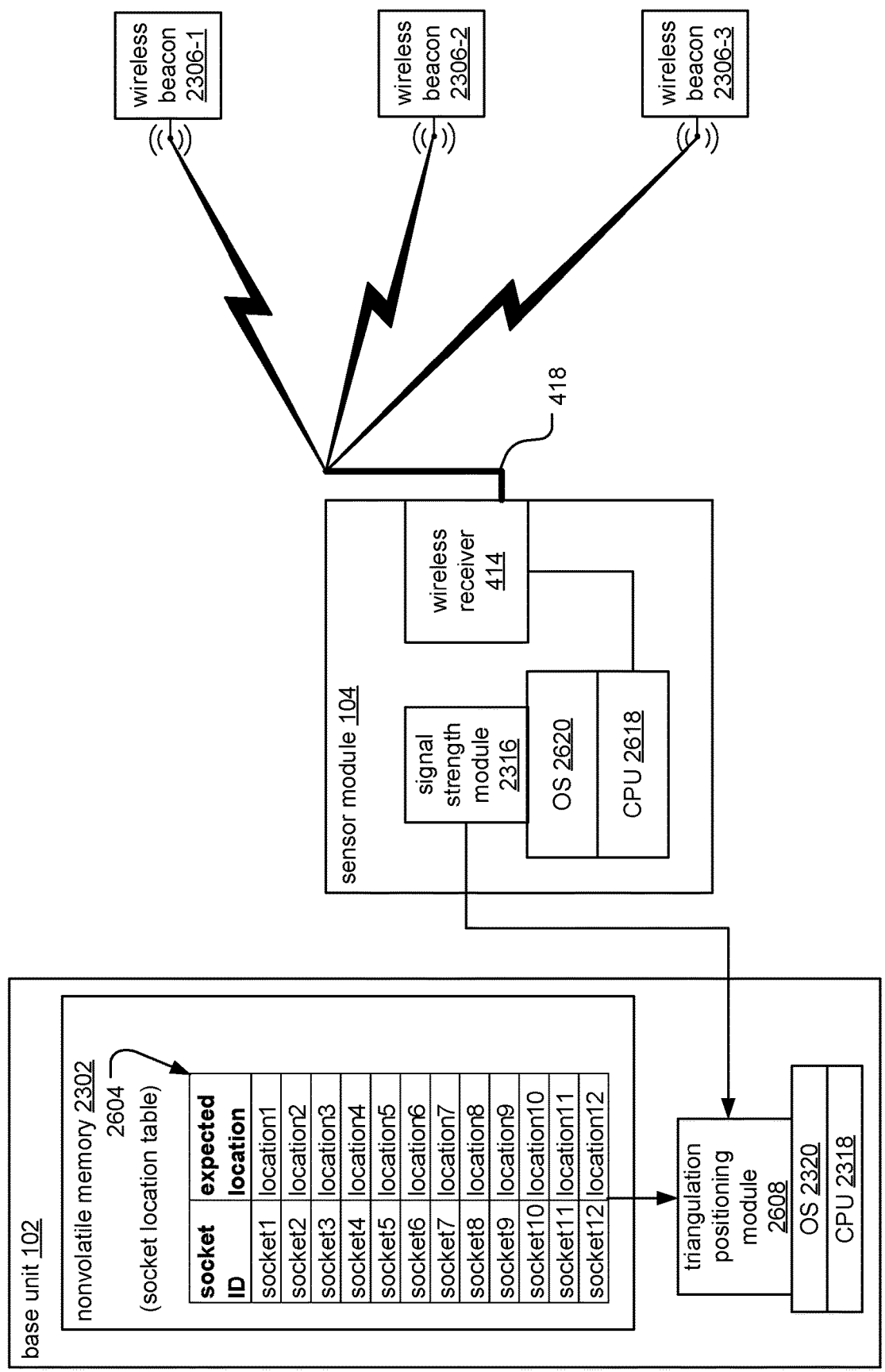
FIG. 8B is a schematic diagram of the sensor module and base unit according to another embodiment of the present invention in which the positions of the sensor modules are determined based on wireless signals transmitted by several wireless beacons.

FIG. 8B is a schematic diagram of the sensor module 104 and base unit 102 according to an alternative embodiment of the present invention in which the positions of the sensor modules 104 are determined based on wireless signals transmitted by several wireless beacons 2306.

Now, the triangulation positioning module 2608 executes on the OS 2320 and CPU 2318 of the base unit 102, and the socket location table 2604 is stored in the nonvolatile memory 2302 of the base unit 102.

In this example, the triangulation positioning module 2608 receives signal strength information from the signal strength modules 2316 of each of the sensor modules 104, calculates location information for each of the sensor modules 104, and retrieves the socket IDs from the socket location table 2604 for each of the sensor modules 104 based on the location information, as previously described.

FIG. 9 is a plan view of the mounting dome 203, base unit 102 and one exemplary sensor module 104 showing the sensor module 104 receiving wireless signals transmitted by three exemplary wireless beacons 2306.

In the illustrated example, one sensor module 104 is attached to the mounting dome at a mounting point. Three wireless beacons 2306-1, 2306-2, 2306-3 are positioned on the base unit 102 at varying distances from the sensor modules 104. For example, wireless beacon 2306-1 is positioned the closest to the sensor module 104, followed by wireless beacon 2306-2 and then by wireless beacon 2306-3. As a result, different signal strength information would be generated by the sensor module 104 for the wireless signals originating from each of the different wireless beacons 2306, and the location of the sensor module 104 with respect to the three wireless beacons 2306 could be calculated based on the signal strength information.

Figure 10:
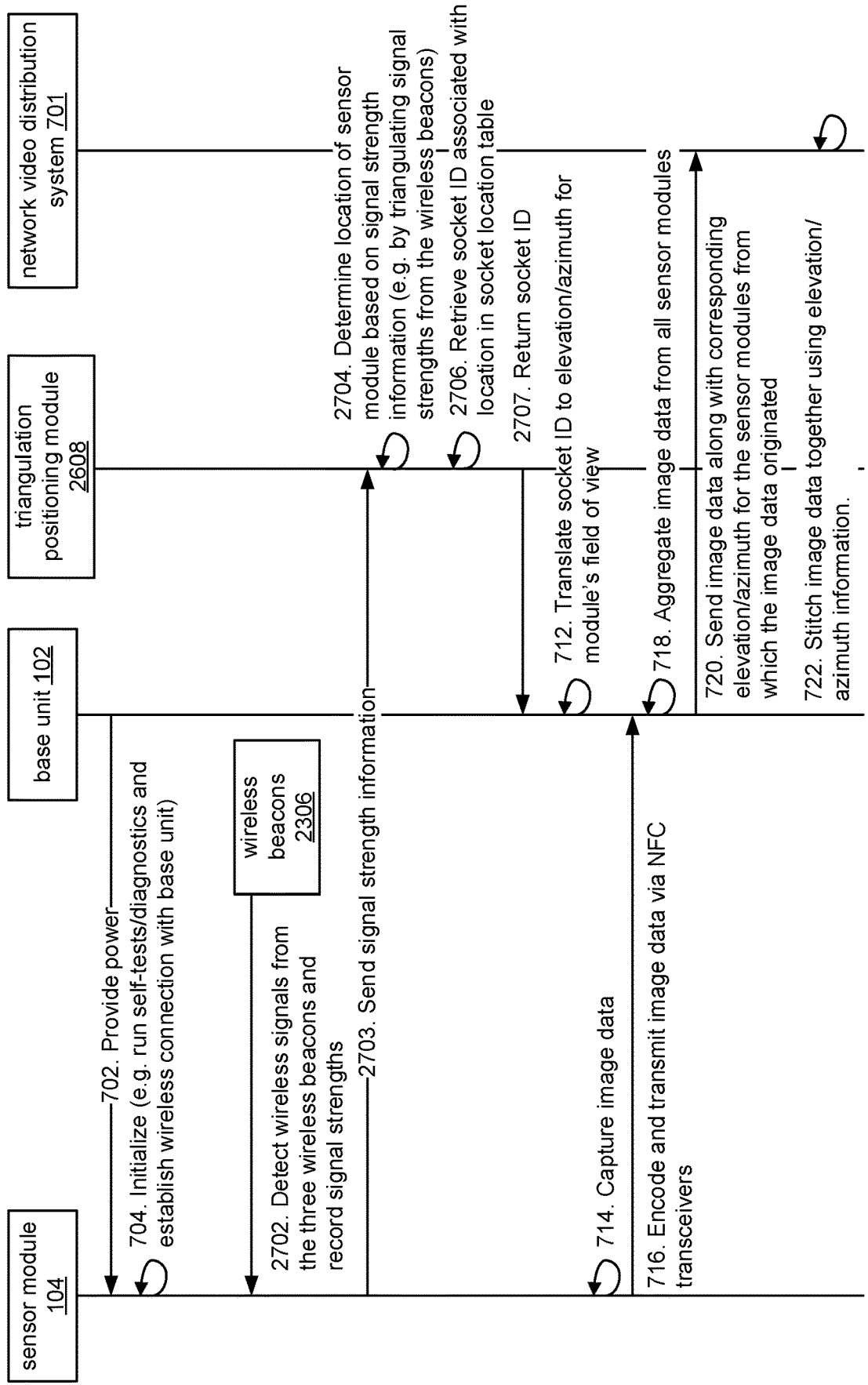
FIG. 10 is a sequence diagram illustrating the process by which the base unit determines the location of the sensor modules via the triangulation positioning module and reports to the network video distribution system.

FIG. 10 is a sequence diagram illustrating the process by which the base unit 102 determines the location of the sensor modules 104 via the triangulation positioning module 2608 and reports to the network video distribution system 701.

Steps 702 and 704 proceed as previously described.

Now, however, in step 2702, the wireless beacons 2306 transmit wireless signals, which are detected and for which signal strength information is generated by the signal strength module 2316 of the sensor module 104. In step 2703, the sensor module 104 sends the signal strength information to the triangulation positioning module 2608, which can be executing on either the base unit 102 or the sensor module 104.

In step 2704, the triangulation positioning module 2608 generates location information, for example, by calculating a location of the sensor module 104 with respect to the wireless beacons 2306 based on the signal strength information. In step 2706, the triangulation positioning module 2608 determines the socket ID for the mounting socket 204 to which the sensor module 104 is attached, based on the location information. In one example, the triangulation positioning module 2608 retrieves from the socket location table 2604 the socket ID associated with expected location information that matches the calculated location information for the sensor module 104. The triangulation positioning module 2608 returns the socket ID to the base unit 102 in step 2707.

Steps 712 through 722 then proceed as previously described.

This process repeats for each sensor module 104 that is attached to the base unit 102.

In the example in which the triangulation positioning module 2608 executes on the base unit 102, the triangulation positioning module receives signal strength information from several different sensor modules 104 and returns different socket IDs for those sensor modules 104. On the other hand, when the triangulation positioning module 2608 executes on the sensor module 104, multiple triangulation positioning modules 2608 each return a single socket ID to the base unit 102.

Figure 11:
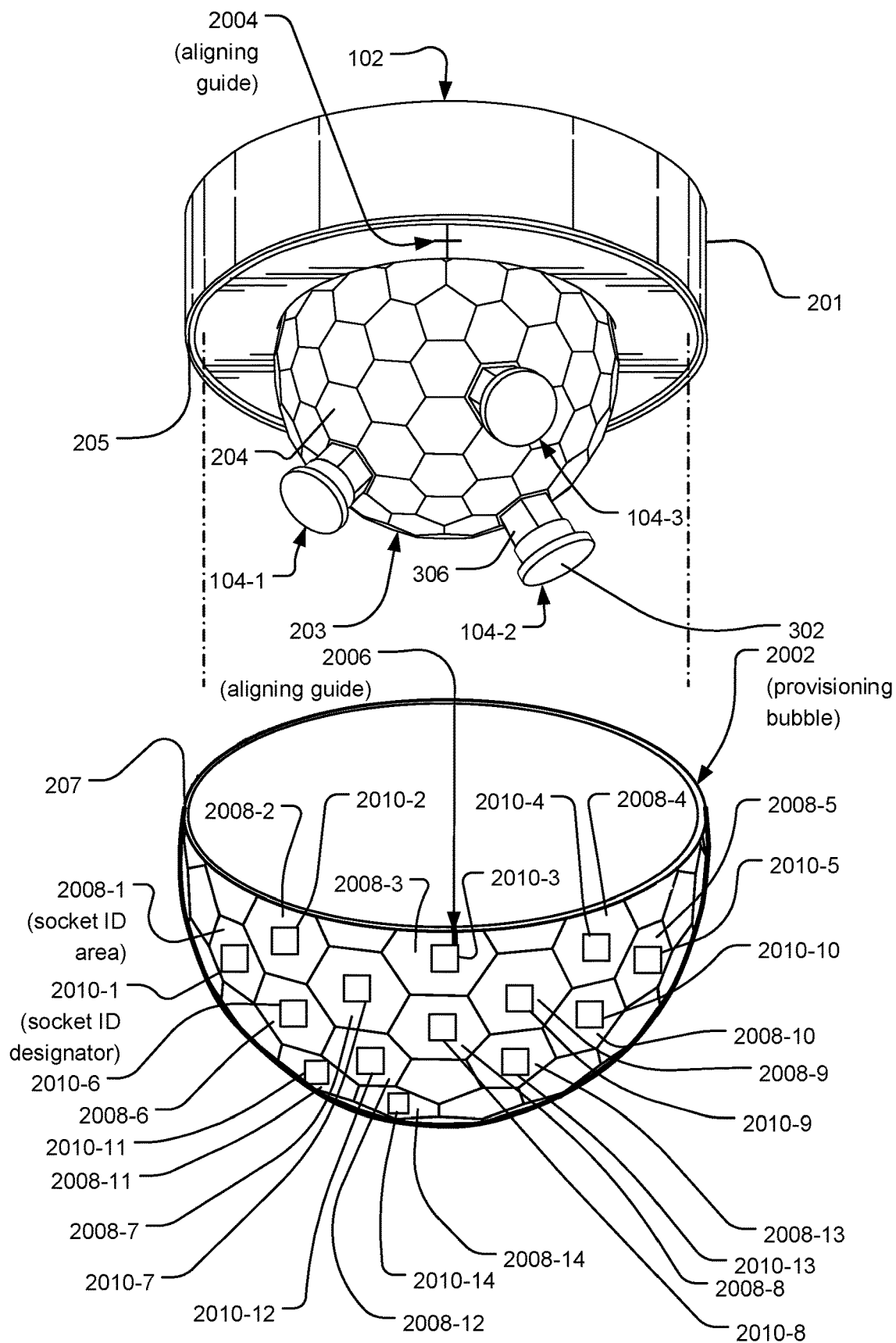
FIG. 11 is a perspective view of a provisioning bubble exploded off of the security camera system.

FIG. 11 is a perspective view of a provisioning bubble 2002 exploded off of the security camera system 100.

The provisioning bubble 2002 includes socket ID areas 2008 and socket ID designators 2010. The socket ID areas 2008 are regions of the surface of the provisioning bubble 2002 that are visible by the sensor modules 104 attached to the base unit 102 and correspond to the field of view from each of the mounting sockets 204 of the base unit 102. In one example, the material of the bubble is transparent or transmissive. The socket designators 2010 are graphical or optical representations of data, including optical codes such as barcodes and/or matrix barcodes, and/or alphanumeric characters, among other examples. The socket designators 2010 provide identification information (such as the socket ID) for the mounting sockets 204 from which the socket ID designators 2010 are visible by the sensor modules 104.

In general, the provisioning bubble 2002 facilitates automatic detection of the locations of sensor modules 104 by arranging socket ID designators 2010 within the different fields of view of the attached sensor modules 104. The sensor modules 104 generate image data, which includes depictions of the socket ID designators 2010 within the fields of view of the sensor modules 104.

In different examples, the provisioning bubble 2002 can be transparent, translucent or opaque, and the socket designators 2010 can be engraved, printed, or attached, among other examples, to the interior or exterior surface of the provisioning bubble 2002 such that they are visible and included in the field of view of the sensor modules 104.

In the preferred embodiment, the provisioning bubble 2002 is temporarily secured over the base unit 102 and the sensor modules 104, in a similar manner as the transparent bubble 106. In another example, the provisioning bubble 2002 is temporarily secured over the base unit 106, sensor modules 104 and the transparent bubble 106.

Additionally, the provisioning bubble 2002 includes an aligning guide 2006. Similarly, the base unit 102 includes a base unit aligning guide 2004. The aligning guides allow for correct rotational alignment of the provisioning bubble 2002 with respect to the base unit 102. In one example, the provisioning bubble 2002 is secured over the security camera system 100 such that the aligning guide 2006 of the provisioning bubble 2002 aligns with the aligning guide 2004 of the base unit 102.

Figure 12:
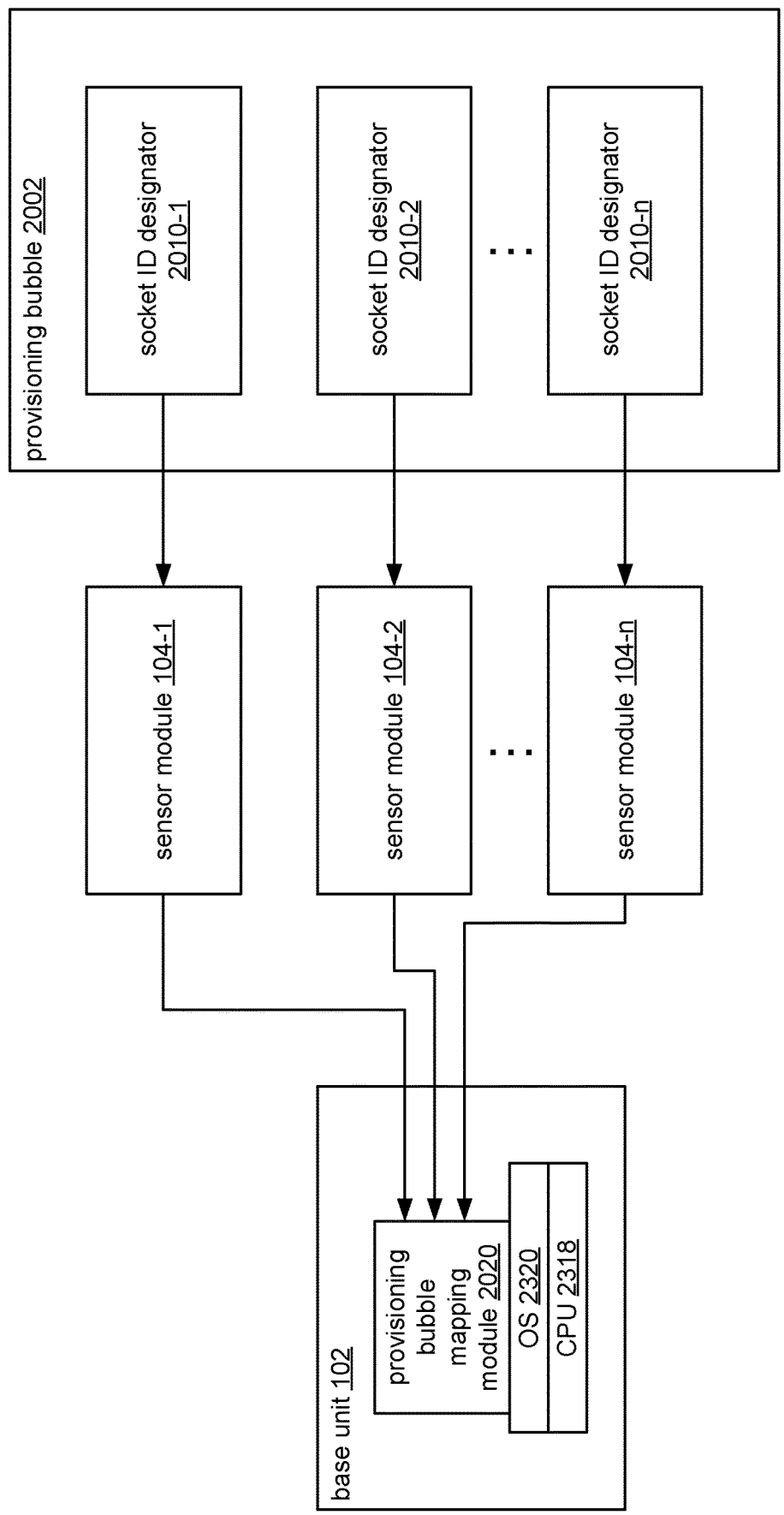
FIG. 12 is a schematic diagram of the base unit, sensor modules and provisioning bubble, illustrating how image data including socket ID designators on the provisioning bubble is captured by corresponding sensor modules and directed to a provisioning bubble mapping module.

FIG. 12 is a schematic diagram of the base unit 102, sensor modules 104 and provisioning bubble 2002, illustrating how image data including socket ID designators 2010 on the provisioning bubble 2002 is captured by corresponding sensor modules 104 and directed to a provisioning bubble mapping module 2020.

As previously described, the socket ID designators 2010 are arranged across the provisioning bubble 2002 within the socket ID areas 2008 in such a way that image data generated by the sensor modules 104 will include a depiction of the socket ID designator 2010 corresponding to the mounting socket 204 to which the sensor module 104 is attached. In this way, the sensor module 104 captures the socket ID designator 2010. For example, sensor module 104-1, attached to mounting socket 204-1 (not illustrated), captures socket ID designator 2010-1 corresponding to mounting socket 204-1. Similarly, sensor module 104-2, captures the socket ID designator 2010-2, and sensor module 104-n, captures the socket ID designator 2010-n.

Each of the sensor modules 104 sends the image data including the depictions of the corresponding socket ID designators 2010 to the provisioning bubble mapping module 2020, which executes on the OS 2320 and the CPU 2318 of the base unit 102. The provisioning bubble mapping module 2020 determines the socket ID for the mounting sockets 204 to which the sensor modules 104 are attached by analyzing the image data, detecting the socket ID designators 2010 depicted therein, and, for example, decoding and/or translating the socket ID designators 2010 (e.g. scanning optical codes, text recognition) to determine the socket IDs represented by the socket ID designators 2010.

Figure 13:
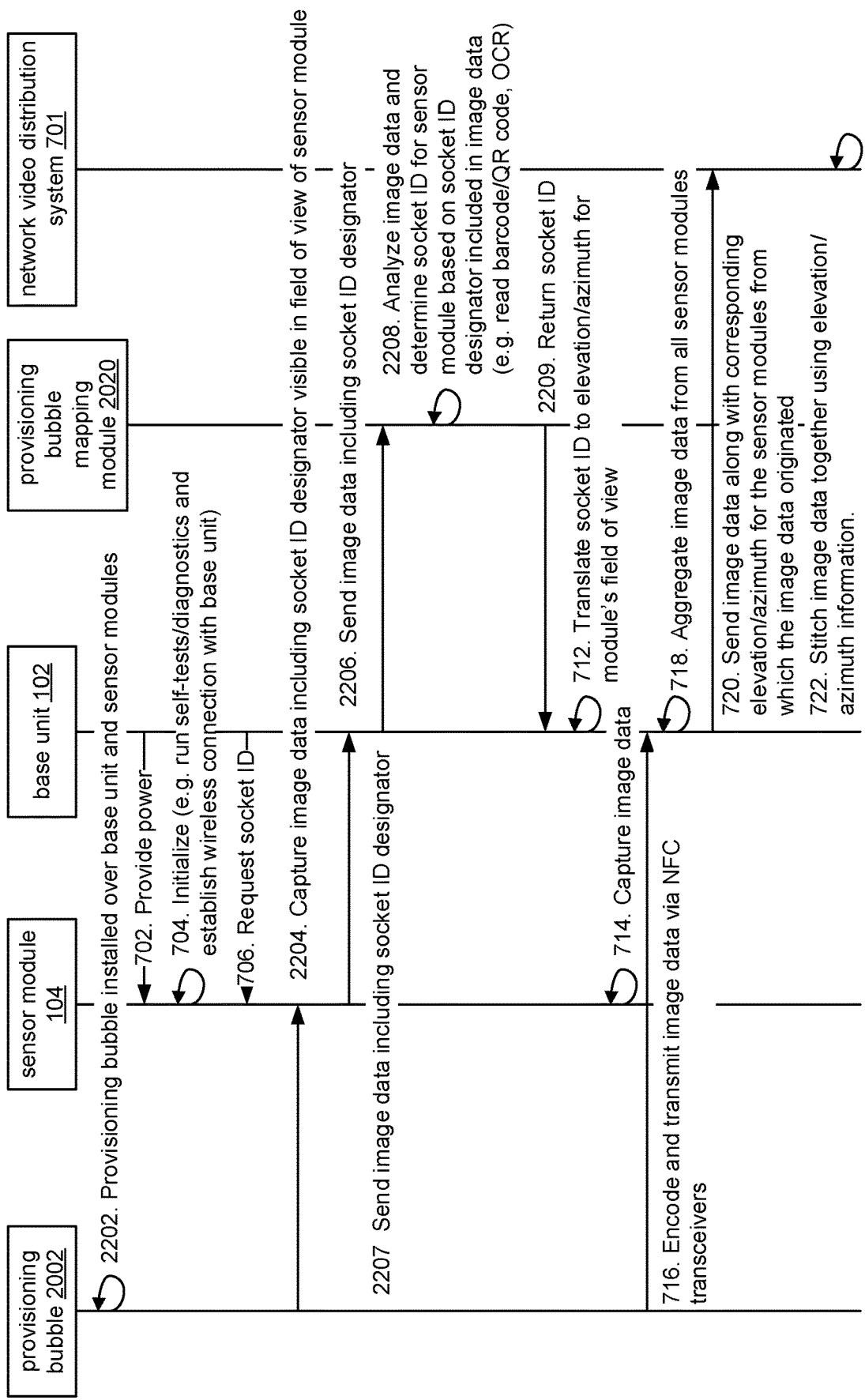
FIG. 13 is a sequence diagram illustrating the process by which the base unit determines the location of the sensor modules via the provisioning bubble mapping module and reports to the network video distribution system.

FIG. 13 is a sequence diagram illustrating the process by which the base unit 102 determines the location of the sensor modules 104 via the provisioning bubble mapping module 2020 and reports to the network video distribution system 701.

In step 2202, the provisioning bubble 2002 is installed over at least the base unit 102 and the sensor modules 104 (and also possibly the transparent bubble 106) and/or other components of the security camera system 100.

Steps 702 through 706 proceed as previously described.

In step 2204, the sensor modules 104 capture image data, including the corresponding socket ID designators 2010 that are visible from the fields of view of the sensor modules 104. This image data is sent by the sensor modules 104 to the base unit 102 in step 2206. In step 2207, the base unit 102 sends the image data to the provisioning bubble mapping module 2020.

In step 2208, the provisioning bubble mapping module 2020 analyzes the image data and determines the socket ID for the mounting sockets 204 to which each sensor module 104 is attached based on the socket ID designator 2010 depicted in the image data generated by the different sensor modules 104, for example, by detecting the socket ID designator 2010, decoding the socket ID designator 2010 (e.g. by reading an optical code or via OCR text recognition). In step 2209, the socket ID is returned from the provisioning bubble mapping module 2020 to the base unit 102.

Steps 712 through 722 then proceed as previously described.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera system, comprising:
a base unit including a mounting dome having a plurality of mounting points;
a plurality of wireless transmitters for transmitting wireless signals, wherein each wireless transmitter is positioned on the base unit at a varying distance from each of the plurality of mounting points;
a plurality of sensor modules for attaching to the base unit at the plurality of mounting points and generating image data, the plurality of sensor modules comprising a plurality of wireless receivers for detecting the wireless signals, and a plurality of signal strength modules for generating signal strength information based on the wireless signals;
a first positioning module associated with the base unit and configured to determine first positions of the plurality of sensor modules based on the signal strength information received from each of the plurality of sensor modules, wherein each of the plurality of sensor modules has a different distance from the first positioning module;
a second positioning module configured to determine second positions for the plurality of sensor modules based on performing a triangulation method using the signal strength information from the first positioning module to identify which mounting point each sensor module is attached to, wherein the triangulation method further comprises calculating location information for each of the plurality of sensor modules, and retrieving socket IDs from a socket location table for each of the plurality of sensor modules based on the location information; and
a transparent bubble that is secured to the base unit to encase the mounting dome, the plurality of wireless transmitters, the plurality of sensor modules, the first positioning module, and the second positioning module;
wherein the base unit combines the image data from the plurality of sensor modules with corresponding elevation and azimuth information to generate security video information based on the first and second positions and transmits the security video information to a network video distribution system to be stitched together.

2. The system as claimed in claim 1, wherein the first positioning module determines the first positions of the plurality of sensor modules by comparing the signal strength information to expected signal strength information stored for each of the plurality of mounting points.

3. The system as claimed in claim 1, wherein the first positioning module determines the first positions of the plurality of sensor modules by generating location information indicating locations of the plurality of sensor modules with respect to the plurality of wireless transmitters based on the signal strength information and comparing the location information to expected location information stored for each of the plurality of mounting points.

4. The system as claimed in claim 1, wherein the plurality of wireless transmitters are integral with or attached to the base unit.

5. The system as claimed in claim 1, wherein the plurality of wireless transmitters are positioned at predetermined distances away from the base unit.

6. A method for configuring a multi-sensor security camera system, comprising:
transmitting wireless signals using one or more wireless transmitters attached to a base unit of the multi-sensor security camera system, wherein the base unit includes a mounting dome having a plurality of mounting points and a plurality of sensor modules each attached to a respective one of the plurality of mounting points, wherein each wireless transmitter is positioned on the base unit at a varying distance from each of the plurality of mounting points;
generating signal strength information, based on the wireless signals, using a plurality of signal strength modules each attached to the base unit at a respective one of the plurality of mounting points;
determining first positions of the plurality of sensor modules based on receiving the signal strength information from each sensor module using a positioning module, wherein each of the plurality of sensor modules has a different distance from the positioning module;
determining second positions for the plurality of sensor modules based on performing a triangulation method using the determined signal strength information to identify which mounting point each sensor module is attached to, wherein the triangulation method further comprises calculating location information for each of the plurality of sensor modules, and retrieving socket IDs from a socket location table for each of the plurality of sensor modules based on the location information;
generating image data using the plurality of sensor modules;
combining the image data from the plurality of sensor modules with corresponding elevation and azimuth information to generate security video information based on the first and second positions; and
transmitting the security video information to a network video distribution system to be stitched together, wherein a transparent bubble is secured to the base unit to encase the mounting dome, the one or more wireless transmitters, the plurality of sensor modules, and the positioning module.

7. The method as claimed in claim 6, further comprising determining the first positions of the plurality of sensor modules by comparing the signal strength information to expected signal strength information stored for each of the plurality of mounting points.

8. The method as claimed in claim 6, further comprising determining the first positions of the plurality of sensor modules by generating location information indicating locations of the plurality of sensor modules with respect to the one or more wireless transmitters based on the signal strength information and comparing the location information to expected location information stored for each of the plurality of mounting points.

9. The method as claimed in claim 6, wherein the one or more wireless transmitters are integral with or attached to the base unit.

10. The method as claimed in claim 6, wherein the one or more wireless transmitters are positioned at predetermined distances away from the base unit.

11. The system as claimed in claim 1, wherein the first positioning module determines to which mounting point each sensor module is attached by comparing the signal strength information generated by each sensor module to expected signal strength information stored for each of the plurality of mounting points on the base unit and returning identification information for a mounting point associated with the expected signal strength information that best matches the signal strength information generated by each sensor module.

12. The system as claimed in claim 11, wherein the expected signal strength information includes expected signal strength measurements of respective wireless signals transmitted by each wireless transmitter and recorded at the first and second positions of the plurality of sensor modules associated with each of the plurality of mounting points.

13. The system as claimed in claim 1, wherein each wireless transmitter of the plurality of wireless transmitters has a different position on the base unit, or each wireless transmitter being a predetermined distance from the base unit.

14. The system as claimed in claim 13, wherein the first positioning module is configured to determine to which mounting point each sensor module is attached by generating location information indicating a calculated location of a respective sensor module with respect to the plurality of wireless transmitters based on the signal strength information, comparing the location information to expected location information stored for each of the plurality of mounting points on the base unit, and returning identification information for a mounting point associated with the expected location that matches the calculated location for the sensor module.

15. The system as claimed in claim 14, wherein the expected location information includes the positions of the plurality of sensor modules with respect to the plurality of wireless transmitters, the positions being associated with different mounting points.

16. The system as claimed in claim 1, wherein the plurality of sensor modules are attached to the base unit such that optical axes of the plurality of sensor modules extend radially from a center of the mounting dome of the base unit in different elevational and azimuthal directions corresponding to the first and second positions of the plurality of sensor modules associated with the plurality of mounting points to which the plurality of sensor modules are attached, and the base unit determines the elevation and azimuth information based at least in part on the first and second positions and configuration information, wherein the mounting dome comprises a hemispherical shape.

17. The system as claimed in claim 16, wherein the elevation and azimuth information is used to stitch together the image data captured by the plurality of sensor modules.

18. The system as claimed in claim 16, wherein the plurality of wireless transmitters are positioned at predetermined distances away from the base unit.

19. The system as claimed in claim 1, wherein the plurality of mounting points are tiled across an entire outer surface of the mounting dome without any regions between the plurality of mounting points.

20. A security camera system, comprising:
a base unit including a mounting dome having a plurality of mounting points;

a plurality of wireless transmitters for transmitting wireless signals, wherein each wireless transmitter is positioned on the base unit at a varying distance from each of the plurality of mounting points;

a plurality of sensor modules for attaching to the base unit at the plurality of mounting points and generating image data, the plurality of sensor modules comprising a plurality of wireless receivers for detecting the wireless signals, and a plurality of signal strength modules for generating signal strength information based on the wireless signals;

a first positioning module associated with the base unit and configured to determine first positions of the plurality of sensor modules based on the signal strength information received from each of the plurality of sensor modules, wherein each of the plurality of sensor modules has a different distance from the first positioning module; and a second positioning module configured to determine second positions for the plurality of sensor modules based on performing a triangulation method using the signal strength information from the first positioning module to identify which mounting point each sensor module is attached to, wherein the triangulation method further comprises calculating location information for each of the plurality of sensor modules, and retrieving socket IDs from a socket location table for each of the plurality of sensor modules based on the location information;

wherein the base unit combines the image data from the plurality of sensor modules with corresponding elevation and azimuth information to generate security video information based on the first and second positions and transmits the security video information to a network video distribution system to be stitched together.

* * * * *